US008819103B2

(12) United States Patent
Fromherz et al.

(10) Patent No.: US 8,819,103 B2
(45) Date of Patent: Aug. 26, 2014

(54) COMMUNICATION IN A DISTRIBUTED SYSTEM

(75) Inventors: Markus P. J. Fromherz, Palo Alto, CA (US); Lara S. Crawford, Mountain View, CA (US); Haitham A. Hindi, Menlo Park, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 2455 days.

(21) Appl. No.: 11/102,355

(22) Filed: Apr. 8, 2005

(65) Prior Publication Data
US 2006/0230201 A1    Oct. 12, 2006

(51) Int. Cl.
G06F 15/16    (2006.01)
H04L 12/24    (2006.01)

(52) U.S. Cl.
CPC ......... H04L 41/0826 (2013.01); *H04L 41/0883* (2013.01); *H04L 41/044* (2013.01); *H04L 41/08* (2013.01); *H04L 41/00* (2013.01)
USPC ............ 709/201; 709/205; 358/1.1; 700/100; 700/103

(58) Field of Classification Search
CPC ... H04L 41/044; H04L 41/08; H04L 41/0863; H04L 41/0826; H04L 41/0883; H04L 41/00
See application file for complete search history.

(56) References Cited

U.S. PATENT DOCUMENTS

| | | |
|---|---|---|
| 4,310,878 A | 1/1982 | Hyatt |
| 4,579,466 A | 4/1986 | Sato |
| 4,587,532 A | 5/1986 | Asano |
| 4,788,647 A | 11/1988 | McManus et al. |
| 4,826,148 A | 5/1989 | Coons, Jr. |
| 4,836,119 A | 6/1989 | Siraco |
| 5,080,340 A | 1/1992 | Hacknauer |
| 5,095,342 A | 3/1992 | Farrell |
| 5,159,395 A | 10/1992 | Farrell |
| 5,208,640 A | 5/1993 | Horie |
| 5,272,511 A | 12/1993 | Conrad |
| 5,305,447 A | 4/1994 | Hampshire |
| 5,326,093 A | 7/1994 | Sollitt |
| 5,363,175 A | 11/1994 | Matysek |
| 5,389,969 A | 2/1995 | Suzuki |

(Continued)

OTHER PUBLICATIONS

Mauve, "Consistency in Continuous Distributed Interactive Media," Reihe Informatik, 1999, pp. 1-11.

(Continued)

*Primary Examiner* — Patrice Winder
*Assistant Examiner* — Nam Tran
(74) *Attorney, Agent, or Firm* — Fay Sharpe LLP

(57) ABSTRACT

Controllers communicate commands in terms of goals and constraints. A goal is an objective. A constraint is information regarding how the goal is to be achieved. For example, a constraint may specify when, or how much of, a resource may be used to achieve a goal. Additionally, or alternatively, a constraint may specify an acceptable or expected accuracy or tolerance regarding how the goal is achieved. Each controller is expected to achieve assigned goals in accord with associated constraints. Thereby, system communication may be reduced. If controllers achieve goals according to specified constraints, the controllers do not need to provide updates or be updated regarding the status of activities of other controllers or regarding other operational context information. In some embodiments, commands are generally not acknowledged. Instead, serving controllers respond to a command with an error message if a goal cannot be met in accord with an associated constraint.

36 Claims, 4 Drawing Sheets

(56) References Cited

U.S. PATENT DOCUMENTS

| | | | |
|---|---|---|---|
| 5,435,544 A | 7/1995 | Mandel | |
| 5,448,735 A | 9/1995 | Anderson et al. | |
| 5,473,419 A | 12/1995 | Russel | |
| 5,504,568 A | 4/1996 | Saraswat | |
| 5,525,031 A | 6/1996 | Fox | |
| 5,542,088 A | 7/1996 | Jennings et al. | |
| 5,557,367 A | 9/1996 | Yang | |
| 5,568,246 A | 10/1996 | Keller | |
| 5,570,172 A | 10/1996 | Acquaviva | |
| 5,596,416 A | 1/1997 | Barry | |
| 5,629,762 A | 5/1997 | Mahoney | |
| 5,636,124 A | 6/1997 | Rischar et al. | |
| 5,710,968 A | 1/1998 | Clark | |
| 5,727,135 A * | 3/1998 | Webb et al. | 358/1.14 |
| 5,778,377 A | 7/1998 | Marlin | |
| 5,838,596 A | 11/1998 | Shimomura et al. | |
| 5,870,545 A | 2/1999 | Davis et al. | |
| 5,884,910 A | 3/1999 | Mandel | |
| 5,991,669 A | 11/1999 | Dominke et al. | |
| 5,995,721 A | 11/1999 | Rourke | |
| 5,999,758 A * | 12/1999 | Rai et al. | 399/16 |
| 6,059,284 A | 5/2000 | Wolf | |
| 6,091,998 A * | 7/2000 | Vasko et al. | 700/100 |
| 6,116,157 A | 9/2000 | Hayama et al. | |
| 6,125,248 A | 9/2000 | Moser | |
| 6,241,242 B1 | 6/2001 | Munro | |
| 6,260,148 B1 * | 7/2001 | Aggarwal et al. | 726/14 |
| 6,297,886 B1 | 10/2001 | Cornell | |
| 6,332,663 B1 * | 12/2001 | Puzio | 347/19 |
| 6,384,918 B1 | 5/2002 | Hubble, III | |
| 6,421,570 B1 * | 7/2002 | McLaughlin et al. | 709/201 |
| 6,424,900 B2 | 7/2002 | Murray et al. | |
| 6,450,711 B1 | 9/2002 | Conrow | |
| 6,476,376 B1 | 11/2002 | Biegelsen | |
| 6,476,923 B1 | 11/2002 | Cornell | |
| 6,493,098 B1 | 12/2002 | Cornell | |
| 6,496,755 B2 | 12/2002 | Wallach et al. | |
| 6,496,848 B1 | 12/2002 | Nankaku | |
| 6,520,616 B1 * | 2/2003 | Parks et al. | 347/19 |
| 6,537,910 B1 | 3/2003 | Burke | |
| 6,550,762 B2 | 4/2003 | Stoll | |
| 6,554,276 B2 | 4/2003 | Jackson | |
| 6,577,925 B1 | 6/2003 | Fromherz | |
| 6,607,320 B2 | 8/2003 | Bobrow | |
| 6,608,978 B2 * | 8/2003 | Robertson et al. | 399/82 |
| 6,608,988 B2 | 8/2003 | Conrow | |
| 6,612,566 B2 | 9/2003 | Stoll | |
| 6,615,091 B1 | 9/2003 | Birchenough et al. | |
| 6,621,576 B2 | 9/2003 | Tandon | |
| 6,633,382 B2 | 10/2003 | Hubble, III | |
| 6,639,669 B2 | 10/2003 | Hubble, III | |
| 6,640,156 B1 | 10/2003 | Brooks et al. | |
| 6,652,169 B2 * | 11/2003 | Parry | 400/74 |
| 6,819,906 B1 | 11/2004 | Herrmann | |
| 2001/0023377 A1 | 9/2001 | Wehrung et al. | |
| 2001/0029408 A1 | 10/2001 | Murray et al. | |
| 2001/0034557 A1 | 10/2001 | Hudson et al. | |
| 2002/0078012 A1 | 6/2002 | Ryan | |
| 2002/0103559 A1 | 8/2002 | Gartstein | |
| 2002/0138242 A1 | 9/2002 | Wilensky et al. | |
| 2002/0140959 A1 * | 10/2002 | Harper | 358/1.13 |
| 2002/0178292 A1 | 11/2002 | Mushkin et al. | |
| 2000/2019426 | 12/2002 | Owada et al. | |
| 2002/0194269 A1 | 12/2002 | Owada et al. | |
| 2003/0005180 A1 | 1/2003 | Schmit et al. | |
| 2003/0077095 A1 | 4/2003 | Conrow | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0111339 A1 | 6/2004 | Wehrung et al. | |
| 2004/0150156 A1 | 8/2004 | Fromherz | |
| 2004/0150158 A1 | 8/2004 | Biegelsen | |
| 2004/0153983 A1 | 8/2004 | McMillan | |
| 2004/0174408 A1 * | 9/2004 | Johnson | 347/22 |
| 2004/0216002 A1 | 10/2004 | Fromherz | |
| 2004/0225391 A1 | 11/2004 | Fromherz | |
| 2004/0225394 A1 | 11/2004 | Fromherz | |
| 2004/0236691 A1 | 11/2004 | Force et al. | |
| 2004/0250168 A1 * | 12/2004 | Tichy et al. | 714/38 |
| 2004/0267868 A1 * | 12/2004 | Wilk | 709/200 |
| 2005/0122339 A1 | 6/2005 | Andrews et al. | |
| 2006/0033771 A1 | 2/2006 | Lofthus | |
| 2006/0069599 A1 * | 3/2006 | Hatoun et al. | 705/8 |
| 2006/0095672 A1 | 5/2006 | Andrews et al. | |
| 2006/0195842 A1 | 8/2006 | Williams | |
| 2006/0221362 A1 | 10/2006 | Julien | |
| 2006/0277053 A1 * | 12/2006 | Lobb et al. | 705/1 |

OTHER PUBLICATIONS

Website at http://www.cis.upenn.edu/~kumar/wcc/, Block Island Workshop on Cooperative Control, 2003, 1 page.
Website at http:/meetingmattersplus.net/CCO3.html, Conference on Cooperative Control and Optimization, 2003, 2 pages.
Website at http://www.ise.ufl.edu/cao/cco/, 4$^{th}$ International Conference on Cooperative Control and Optimization, 2002, 1 page.
Website at http://www.ise.ufl.edu/cao/cco, Conference on Cooperative Control and Optimization, 2001, 1 page.
Website at http://www.seas.ucla.edu/coopcontrol/, Cooperative Control of Distributed Autonomous Vehicles in Adversarial Environments AFOSR cooperative control MURI, 2 pages.
U.S. Appl. No. 10/357,687, filed Feb. 4, 2003, Biegelsen, et al.
U.S. Appl. No. 10/357,761, filed Feb. 4, 2003, Fromherz, et al.
U.S. Appl. No. 10/740,705, filed Dec. 19, 2003, Biegelsen, et al.
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/812,376, filed Mar. 29, 2004, Duff, et al.
U.S. Appl. No. 10/860,195, filed Jun. 6, 2004, Lofthus, et al.
U.S. Appl. No. 10/881,619, filed Jun. 30, 2004, Bobrow.
U.S. Appl. No. 10/917,768, filed Aug. 13, 2004, Lofthus.
U.S. Appl. No. 10/924,106, filed Aug. 23, 2004, Lofthus.
U.S. Appl. No. 10/924,113, filed Aug. 23, 2004, deJong, et al.
U.S. Appl. No. 10/924,459, filed Aug. 23, 2004, Mandel, et al.
R. Luck and A. Ray, "An Observer-based Compensator for Distributed Delays," *Automatica*, vol. 26, No. 5, pp. 903-908, 1990.
J.-J. E. Slotine and W. Wang, "A Study of Synchronization and Group Cooperation Using Partial Contraction Theory," in *Cooperative Control: A Post-Workshop Volume 2003 Block Island Workshop on Cooperative Control*, V. Kumar, N. Leonard, and A. S. Morse, eds., Springer, 2005.
L. A. Montestruque and P. J. Antsaklis, "Networked Control Systems: A Model-Based Approach," in Proceedings of the *12th IEEE Mediterranean Conference on Control and Automation*, Kusadasi, Turkey, Jun. 6-9, 2004.
F. Borrelli, T. Keviczky, G. J. Balas, G. Stewart, K. Fregene, and D. Godbole, "Hybrid Decentralized Control of Large Scale Systems," in *Hybrid Systems: Computation and Control: 8th International Workshop*, (HSCC 2005), M. Morari and L. Thiele, eds., Zurich, Switzerland, Mar. 9-11, 2005.
Fromherz, et al., "Coordinated Control for Highly Reconfigurable Systems," published at HSCC 2005, Zurich, Switzerland, copyright Springer-Verlag.
Website at http://www.springerlink.com/app/home/contribution.asp, Accelerating the World of Search, 2005, pp. 1 & 2.
Hindi, et al., "Synchronization of State Based Control Processes with Delayed and Asynchronous Measurements," unpublished paper submitted to 44$^{th}$ IEEE Conference on Decision and Control and European Control Conference ECC 2005.
Website at http://www.esi2.us.es/~cdcecc05, 44$^{th}$ IEEE Conference on Decision and Control and European Control Conference ECC 2005, pp. 1-3.
Morgan, P.F., "Integration of Black Only and Color Printers", Xerox Disclosure Journal, vol. 16, No. 6, Nov./Dec. 1991, pp. 381-383.
Desmond Fretz, "Cluster Printing Solution Announced", Today at Xerox (TAX), No. 1129, Aug. 3, 2001.
U.S. Appl. No. 10/924,458, filed Aug. 23, 2004, Lofthus et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.

(56) References Cited

OTHER PUBLICATIONS

U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/002,528, filed Dec. 2, 2004, Lofthus et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus, et al.

* cited by examiner

COMMUNICATION IN A DISTRIBUTED SYSTEM

CROSS REFERENCE

The following applications, the disclosures of each being totally incorporated herein by reference are mentioned: U.S. Patent Application, filed, for Coordination in a Distributed System by Lara S. Crawford, et al. (20041210-US-NP, XERZ 2 00863); U.S. patent application Ser. No., filed, for Synchronization in a Distributed System by Lara S. Crawford, et al. (20041209-US-NP, XERZ 2 00862); and U.S. patent application Ser. No., filed, for On-The-Fly State Synchronization in a Distributed System by Haitham A. Hindi, et al. (20041214-US-NP, XERZ 2 00865).

BACKGROUND

There is illustrated herein in embodiments, an architecture including methods and systems for communicating between elements in a distributed system. For example, a distributed system may include a collection of modules, each with its own function. The collection of modules may be interconnected to carry out a particular function. The interconnection may be physical and/or logical in nature. Modules may be connected by a network or other communications scheme. Communications media may include wire, coaxial cable, fiber optics and/or radio frequency (RF) transmissions. Some document processors are implemented as distributed systems and embodiments will be described with reference thereto. However, embodiments of the architecture may be beneficially applied in a wide variety of control system environments.

Document processors include, for example, printers, copiers, facsimile machines, finishers and devices for creating documents, such as word processors and desk top publishers. In some instances, document processors provide the services of two or more of these devices. For instance, document processors that provide printing, copying, scanning, and faxing services are available. Printers and copiers can include feeders that supply print media and finishers that staple, shrink wrap or otherwise bind system output. Finishers may also fold or collate documents.

In order to increase throughput, some printers and copiers are being developed which include two or more marking engines. For example, U.S. patent application Ser. No. 10/924,113 filed Aug. 23, 2004 by Jonas M. M. deJong, et al. for a Printing System with Inverter Disposed for Media Velocity Buffering and Registration; U.S. patent application Ser. No. 10/924,106 filed Aug. 23, 2004 by Robert M. Lofthus, et al. for a Printing System with Horizontal Highway and Single Pass Duplex; U.S. patent application Ser. No. 10/924,459 filed Aug. 23, 2004 by Barry P. Mandel, et al. for a Parallel Printing Architecture Consisting of Containerized Image Marking Engine Modules; U.S. patent application Ser. No. 10/860,195 filed Jun. 6, 2004 by Robert M. Lofthus, et al. for a Universal Flexible Plural Printer to Plural Finisher Sheet Integration System; U.S. patent application Ser. No. 10/881,619 filed Jun. 30, 2004 by Daniel G. Bobrow for a Flexible Paper Path Using Multidirectional Path Modules; U.S. patent application Ser. No. 10/761,522 filed Jan. 21, 2004 by Barry P. Mandel, et al. for a High Print Rate Merging and Finishing System for Parallel Printing; U.S. patent application Ser. No. 10/785,211 filed Feb. 24, 2004 by Robert M. Lofthus, et al. for a Universal Flexible Plural Printer to Plural Finisher Sheet Integration System; and U.S. patent application Ser. No. 10/917,768 filed Aug. 13, 2004 by Robert M. Lofthus for a Parallel Printing Architecture Consisting of Containerized Image Marking Engines and Media Feeder Modules, all of which are incorporated herein by reference, describe aspects of tightly integrated document processing systems including a plurality of marking engines.

Additionally, some printers and copiers are being developed using a hypermodular structure to increase modularity and flexibility. These systems may possess a number of distributed processors, sensors, and actuators. For example, U.S. patent application Ser. No. 10/357,687 filed Feb. 4, 2003 by David K. Biegelsen, et al., for Media Path Modules; U.S. patent application Ser. No. 10/357,761 filed Feb. 4, 2003 by Markus P. J. Fromherz, et al., for Frameless Media Path Modules; U.S. patent application Ser. No. 10/740,705 filed Dec. 19, 2003 by David K. Biegelsen, et al., for a Flexible Director Paper Path Module; and U.S. patent application Ser. No. 10/812,376 filed Mar. 29, 2004 by David G. Duff, et al., for a Rotational Jam Clearance Apparatus, all of which are incorporated herein by reference, describe aspects of tightly integrated document processing systems including hypermodules.

Some systems, including some document processing systems, are based on a centralized control architecture wherein a single computational platform controls all system actuators and receives all system feedback information. These architectures work well where the systems are relatively small and are of a fixed or unchanging configuration. However, as system size increases, the computational capabilities of a single platform can be overwhelmed. Additionally, providing individual interfaces between the single computational platform and each of the sensors and actuators of the system can be impractical. Furthermore, where it is desirable to assemble or reconfigure a system from various subcomponents, the direct interfacing of sensors and actuators to the central platform becomes problematic.

These factors have led to the development of systems based on network communications. For example, U.S. Pat. No. 6,615,091 B1 to Birchenough, et al. for a Control System and Method Therefore allegedly disclosed an embodiment of a distributed control system including a main control coordinator, three local process station controllers and a designated number of process module controllers, each associated with a process module. The control system allegedly provides a real time operating system and has a communication bus platform provided via an Ethernet™ communication bus and a second bus to connect the controllers in a distributed control network. The Ethernet™ bus connects the main control coordinator and each of the local process station controllers and a continuous motion conveyer controller. Each of the process module controllers are connected via the second bus to designated local process station controllers.

In the system of Birchenough, the main controller agent interacts with each of the process station agents, and each of the process station agents interacts with each of the process module agents that are assigned thereto. During normal manufacturing operation, the main controller coordinator agent sends article notice messages to the process station agents to notify the process station agents of the oncoming articles of manufacture. A process station normally will not process the article of manufacture unless the process station agent which controls a particular process module has received an article notice message indicating that it should do so and the continuous feed indexer has returned a report that it is in proper position. In response, the process station agent notifies the designated process module agent to initiate its programmed process operation. Once the process module has completed its intended operation, the process module agent issues a work report message which is sent to the process station agent. The process station agent then broadcasts the work report message to other process stations as well as to the main control coordinator.

It appears that in the system of Birchenough, et al., a single entity (e.g., the main coordinator) is aware of and maintains information regarding each task, object or workpiece being processed by the system. This may limit the scalability of the system. For example, as the size of the system increases, the capabilities and/or resources of the main control coordinator (or processor running the main control coordinator) may be overwhelmed. Therefore, it may be desirable to distribute some of this functionality over a number of processors or controllers.

However, as machines become more complex and contain larger numbers of embedded processors, instances of tightly coupled distributed control systems are becoming more common. In a tightly coupled system, controllers may interact through fast physical or informational coupling. That is, the actions of one controller may have an impact on an ability of a second controller to perform its function. Therefore, there is a desire for coordination and communication among the various controllers. This need for coordination can overwhelm available network or communication resources.

Therefore, there is a desire for a generic protocol and interface for coordinated control in such systems that can help reduce bandwidth requirements of a system.

BRIEF DESCRIPTION

A method for communicating between a first element and a second element in a system can include determining at least one goal related to a task to be performed by the second element, determining at least one constraint related to how the at least one goal is to be achieved and communicating the at least one goal and the at least one constraint to the second element. The method can also include receiving an error message if the second element is not capable of achieving the at least one goal in accord with the at least one constraint.

The method can also include determining an information source able to provide source information that would be useful in achieving the at least one goal and subscribing to the source information. For example, the first element can subscribe to the information source and communicate or relay the information to the second element.

Some embodiments include determining status information available from the second element that would be useful in monitoring progress of the second element in achieving the at least one goal and subscribing to the determined status information.

Communicating the at least one goal and the at least one constraint can include assembling a message including a command type, a command identifier, a command specification and a command time and transmitting the assembled message from the first element to the second element.

Subscribing to the source information or the status information can include assembling a message including an action type, a command identifier, a subscription specification and a subscription time and transmitting the assembled message.

Communicating the received source or status information can include assembling a message including an action type, a command identifier, a publication specification and a publication time and transmitting the assembled message.

For example possible command types include set, cancel, replace, break, and reject. Break and reject commands can be included in forms of error messages. Cancel and replace commands can be used to cancel or replace communicated goals and constraints. Possible action types include subscribe, publish and update.

A system that can take advantage of the method of communication described above can include, for example, a first system element, a second system element, and a communication link there between. For instance, the first system element can be operative to determine at least one goal related to a task to be performed by the second element, to determine at least one constraint related to how the at least one goal is to be achieved by the second element and to communicate the at least one goal and the at least one constraint to the second element in a message carried over the communications link. The second system element can be operative to receive the message carried over the communications link. The second element may also evaluate the at least one goal and the at least one constraint in light of capabilities of the second element and communicate an error state in a message carried over the communications link to the first element, if the evaluation indicates that the second element is not capable of achieving the at least one goal in accord with the at least one constraint. The system may also include a plurality of sensors.

One or both of the first and second elements may subscribe to or request information from one or more of the plurality of sensors, from each other, or from other system elements. The first element may receive information from one or more other elements or one or more of the sensors and relay or communicate this information to the second element.

Communication of the goals, constraints, sensor and other information can take place through the generation and transmission of messages as described above. For example the messages can include command or action types as well as command, subscription and/or publications specifications. Identifiers and time stamps may also be included.

Some embodiments of the method for communicating between elements in a system include a method that is operative to coordinate activities of a plurality of controllers in a document processing system. For example, the method may beneficially be applied where systems include tightly coupled modules or system portions. The method can include determining a processing path through the document processing system for a sheet of print media, the path including a first module that is tightly coupled to a second module, whereby for at least a portion of a processing performed by the system, both the first module and the second module operate on the sheet at the same time. Additionally, the method can include determining or identifying respective first and second controllers associated with the first and second modules, determining respective cooperative first and second goals and constraints for actions of the first module and the second module, communicating the respective first cooperative goal and constraint to the first controller; and communicating the respective second cooperative goal and constraint to the second controller.

For example, determining cooperative goals and constraints can include determining compatible speeds of operation for the first and second modules or determining compatible directions for the first and second modules to direct the sheet of print media, whereby the sheet of print media will not be damaged as the sheet is simultaneously transported or otherwise acted upon by the first and second modules.

The method can include receiving an error message from one of the controllers if the module associated with the controller is not capable of achieving the respective communicated goal in accord with the respective communicated constraint.

Some embodiments include identifying, subscribing to and/or relaying or communicating information from information sources.

Communication of the goals, constraints, and other information can take place through the generation and transmission of messages as described above. For example the messages can include command or action types as well as command, subscription and/or publications specifications. Identifiers and time stamps may also be included.

Some document processing systems that employ embodiments of the methods described herein include a first xerographic marking engine, a transport system that is operative to transport media to and/or from the first marking engine, the transport system including a plurality of transport actuators and at least one actuator controller that is operative to control at least one transport actuator of the plurality of transport actuators to transport print media based on at least one received goal and at least one received constraint and at least one supervisory controller that is operative to communicate at least one goal and at least one constraint to the at least one actuator controller.

Such systems can include a first marking engine controller that is operative to control at least one aspect of processing of the first xerographic marking engine based on at least one received goal, wherein the at least one supervisory controller is operative to communicate the at least one goal to the first marking engine controller.

Some embodiments include at least a second marking engine. In those systems the transport system is further operative to transport media to and/or from at least the second marking engine. Those systems can include a second marking engine controller that is operative to control at least one aspect of processing of the second marking engine based on at least one received goal, wherein the at least one supervisory controller is operative to communicate the at least one goal to the second marking engine controller.

Embodiments can include a plurality of transport sensors. Each of the plurality of transport sensors can be operative to sense and report one or more aspect of the transportation of the print media as it is transported by the transport system. The at least one actuator controller and/or the at least one supervisory controller can be operative to select a subset of the plurality of sensors based on the received at least one goal, and to subscribe to information reported by the selected subset of sensors. In some cases the at least one supervisory controller is further operative to communicate to the at least one actuator controller aspects of transportation information received, directly or indirectly, from a subset of sensors or other system elements.

The at least one actuator controller can use the information from the supervisory controller to evaluate one or more aspects of actuator performance.

As described above, and in greater detail below, the supervisory, actuator and marking engine controllers can communicate goals, constraints and other information by generating or assembling and communicating or transmitting and receiving messages. For example, the messages can include a command or action type, a command identifier, a command, publication or subscription specification and a command or action time.

DETAILED DESCRIPTION

Figure 1:
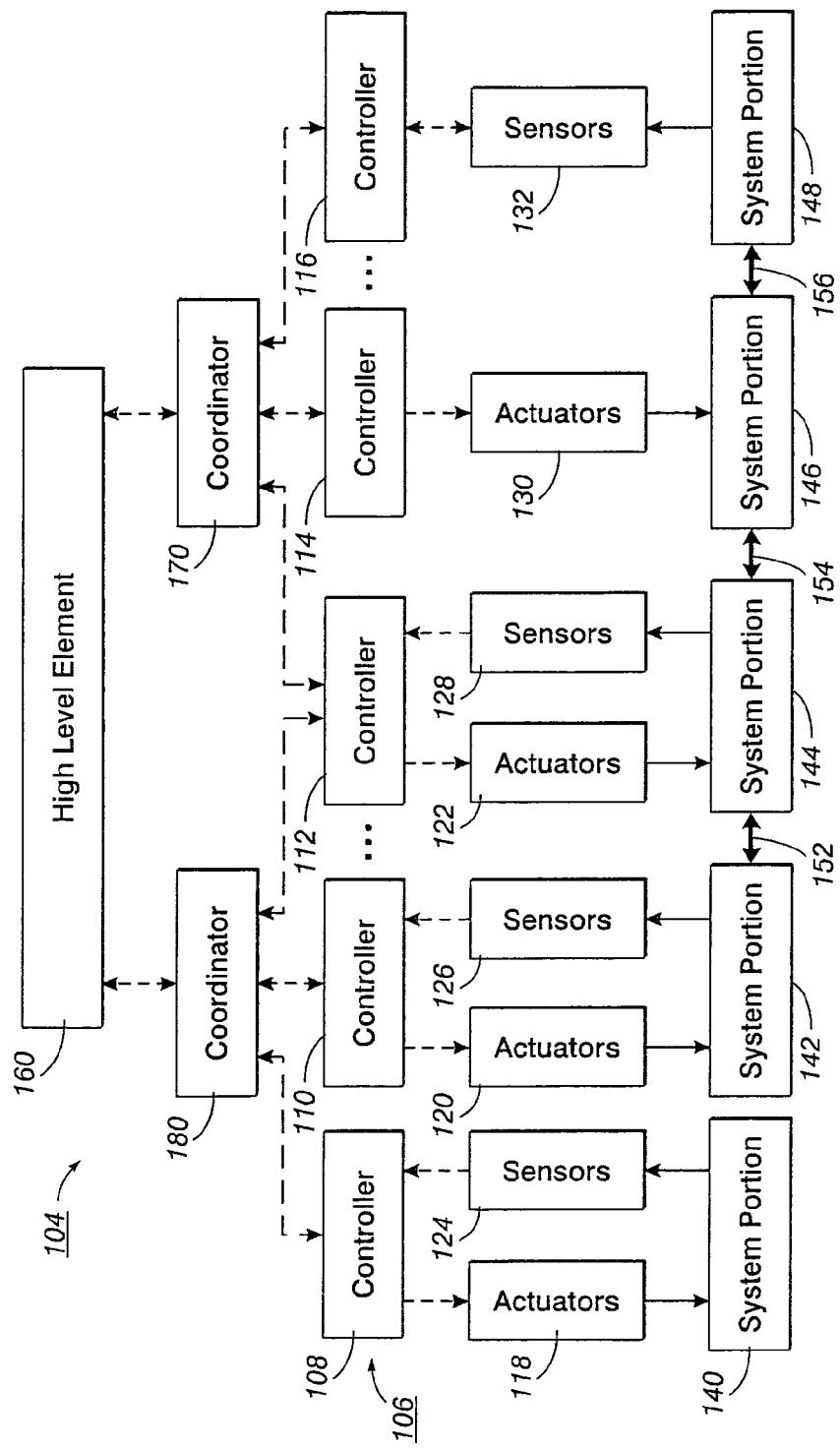
FIG. 1 is a block diagram of a system wherein first or supervisory elements communicate with second or cooperating elements.

Referring to FIG. 1, distributed systems (e.g., 104) often include a communications network for carrying communication between system elements (e.g., 108, 110, 112, 114, 116, 118, 120, 122, 124, 126, 128, 130, 132, 160, 170, 180). Communication bandwidth in such networks can be a limited resource, especially where systems are tightly coupled and system elements need to behave in a cooperative manner. In such systems, some mechanism is needed to ensure that the efforts of one controller or system element do not interfere or counteract the efforts of another system element or controller.

One method for ensuring cooperative control efforts is for each cooperating element to be constantly updated as to the activities of the other cooperating elements, and/or as to the status of progress of a task or workpiece. However, such methods require a great deal of inter-element communication, which may over burden a system network or require the inclusion of a more expensive, higher bandwidth network. An alternative method for ensuring cooperative system element activities is to assign cooperative goals and constraints to the cooperating system elements.

A goal describes a task to be performed. For example, a goal might be to move a workpiece from point A to point B, to move a workpiece at a specified speed or to deliver a workpiece to a particular location. Other examples of goals might include set points, such as a temperature set point, actuator operation, such as to open or close a valve or set a flipper to a first or second position, or to move an actuator at a particular speed.

A constraint is some description regarding how the goal is to be achieved. If goals and constraints are determined by some first or supervisory element that has knowledge regarding goals and constraints sent to the cooperating system elements, then cooperative activities can be ensured. For example, a constraint on the goal of moving a workpiece from point A to point B might be a deadline for delivering the workpiece to point B. By requiring that an element meet the deadline or constraint, the first or supervisory element can ensure that the workpiece is available at point B when a third element will be ready to receive it from point B. If point B will be occupied by another workpiece at a point in time prior to the deadline mentioned above, an additional or alternative constraint might be provided. For example, the constraint on the goal of moving the workpiece from point A to point B might be—do not deliver the workpiece prior to a given time—. Other kinds of constraints may also be employed. For example, a constraint may allocate a portion of a system resource to a system element that is assigned a task. For instance, the goal of moving a workpiece from point A to point B might be associated with a constraint limiting a peak power consumption associated with the task. Such a constraint might ensure that other cooperating controllers are able to draw enough power from a shared system power source to perform their assigned tasks or achieve their respective goals.

Referring to FIG. 1, a first system 104 embodiment includes a plurality 106 of controllers. For example, the plurality 106 of controllers includes a first, second, third, fourth and fifth controller 108, 110, 112, 114, 116. The controllers may, for example, be associated with actuators and sensors. For instance, the first, second and third controllers 108, 110, 112 are associated with first, second and third sets of actuators 118, 120, 122 and first, second and third sets of sensors 124, 126, 128. The fourth controller 114 is associated with a fourth set of actuators 130. The fifth controller 116 is associated with a fourth set of sensors 132. The actuators 118, 120, 122, 130 and sensors 124, 126, 128, 132 manipulate or sense objects in, or aspects of, respective portions of the system 104. For example, the first set of actuators 118 and first set of sensors 124 are associated with a first portion 140 of the system 104. The second set of actuators 120 and the second set of sensors 126 are associated with a second portion 142 of the system 104. The third set of actuators 122 and the third set of sensors 128 are associated with a third portion 144 of the system 104. The fourth set of actuators 130 are associated with a fourth portion 146 of the system 104 and the fourth set of sensors 132 are associated with a fifth portion 148 of the system 104.

Some or all of the system portions may be tightly coupled. Tightly coupled systems or system portions are those wherein the performance or activities of a first system portion has an effect on the performance or activities of a second portion. In such configurations, if the activities of the first portion and the second portion are not coordinated, they may interfere with or disrupt each other. For instance, in an automotive system, an engine/transmission subsystem may be considered to be tightly coupled with a braking subsystem because an uncoordinated application of the braking system may interfere with or prevent the engine/transmission system from propelling a vehicle.

In the embodiment illustrated in FIG. 1, first, second and third elements of system dynamics 152, 154, 156 tightly couple the second system portion 142 to the third system portion 144, tightly couple the third system portion 144 to the fourth system portion 146 and tightly couple the fourth system portion 146 to the fifth system portion 148. The first system portion 140 is illustrated as having only a loose or minimal interaction with the second system portion 142 and is not tightly coupled thereto.

The first system 104 may also include a high level element 160. For example, the high level element 160 may be a scheduler and/or a planner. The high level element 160 determines which tasks are to be performed, or which workpieces are to be processed, and activates, spawns or instantiates a separate coordinator for each task or workpiece. For example, a first coordinator 170 is activated or spawned in association with a first task or workpiece, and a second coordinator 180 is activated or spawned in association with a second task or workpiece. The coordinators 170, 180 are activated and initialized in such a manner as to prevent interference between the coordinators.

For example, if the first task or workpiece and the second task or workpiece both require the services of the first, second, third, fourth and fifth system portions 140, 142, 144, 146, 148, then, for example, the first coordinator 170 is activated and takes control of the first system portion by communicating with the first controller. The activation of the second coordinator 180 may be delayed until the first coordinator 170 no longer requires the services of the first system portion 140. Alternatively, the second coordinator 180 is activated early and directed to wait or idle until such a time as the first coordinator 170 no longer needs the services of a first system resource (e.g., 140).

The first coordinator 170 releases the first controller 108 when the first task or workpiece no longer needs the services of the first system portion 140. The first coordinator 170 may then send commands requesting the services of another system resource (e.g., the second system portion 142) for accomplishing a second subtask. Alternatively, the first coordinator 170 may begin requesting services from the second resource before the first resource has completed a first subtask. In either case, the first coordinator 170 sequentially sends commands to the controllers (e.g., 110, 112, 114, 116) requesting services of their respective system portions (e.g., 142, 144, 146, 148). When appropriate, the first coordinator 170 sends coordinated commands to a plurality of controllers. For example, if a subtask requires coordinated activity between two or more system portions at once, then the coordinator generates and communicates coordinated commands to two or more controllers associated therewith.

In FIG. 1, the first system 104 embodiment is depicted at a point in time wherein the first task or workpiece requires the services of the fourth system portion 146 and the first coordinator is communicating with the fourth controller 114. Proximate to issuing commands to, or taking control of, the fourth controller 114, the third controller 112 may have been deactivated or released from the control of the first coordinator 170. For example, commands previously issued to the third controller 112 might have been associated with an expiration parameter. The expiration parameter may have been, for example, a time limit or a processing milestone. When an event occurs that matches or surpasses the value of the expiration parameter, the third controller 112 may be deactivated or released from the control of the first coordinator 170.

Alternatively, the first workpiece or task may require simultaneous services of both the third system portion 144 and the fourth system portion 146. In that case, the first coordinator generates and communicates coordinated or cooperative commands to the third 112 and fourth 114 controllers.

At an appropriate point, the first coordinator will generate and transmit or communicate demands requesting services of the fifth system portion 148. If the services of the fifth system portion are required contemporaneously with the services of fourth 146 and/or third 144 system portions, then the first coordinator 170 generates and communicates cooperative commands to the fifth 116, fourth 114 and/or third 112 controllers.

FIG. 1 also illustrates the second coordinator 180 to be in communication with the second controller 110. For example, the second coordinator 180 is requesting services of the second system portion 142. The first controller 108 is being, or has been, released from serving the second coordinator 180, and the second coordinator 180 is preparing or will prepare to take control, or request the services of, the third system portion 144 through the third controller 112. Since the second 142 and third system portions are tightly coupled 152, the second controller may generate and communicate cooperative commands to the second 110 and third 112 controllers, thereby directing them to perform cooperative operations or processes on the second task or workpiece.

When the first controller 108 is released or deactivated, it becomes available to execute commands of yet another coordinator (not shown) which the high level element 160 may activate, spawn or instantiate, to coordinate and orchestrate a third task or workpiece processing.

Figure 2:
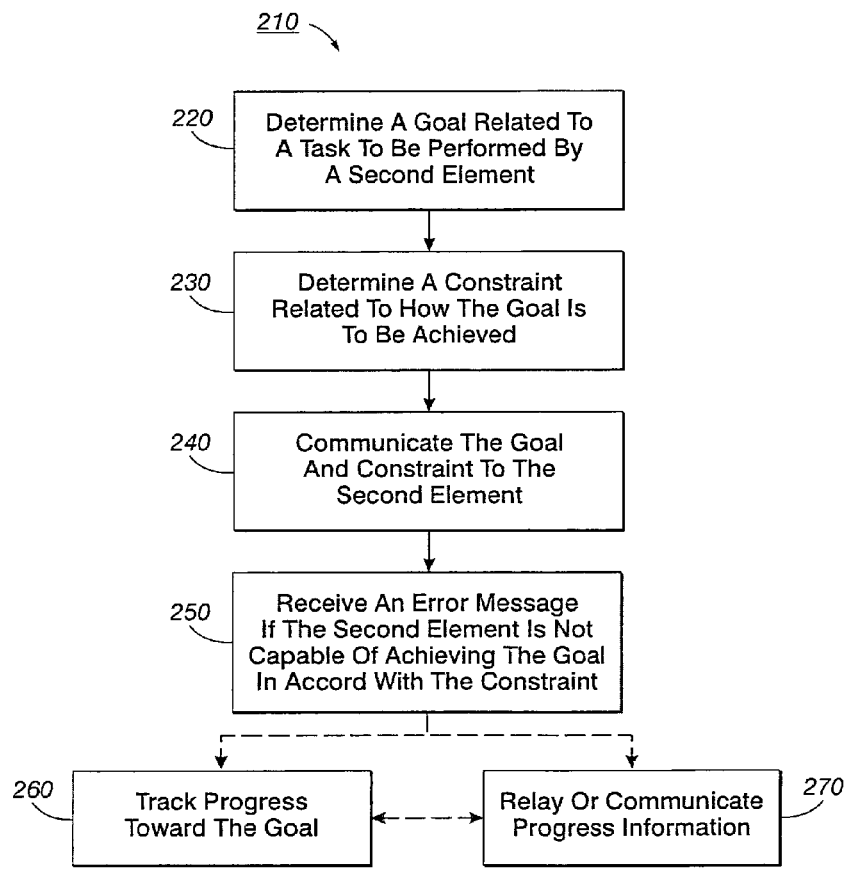
FIG. 2 is a flow chart outlining a method of communication between elements.

Referring to FIG. 2, a method 210 for communicating between a first element and a second element (e.g., 108, 110, 112, 114, 116, 170, 180) in a system (e.g., 104) can include determining 220 a goal related to a task to be performed by the second element, determining 230 a constraint related to how the goal is to be achieved and communicating 240 the goal and constraint to the second element. In some embodiments of such a method, bandwidth demands on system networks are reduced because the need for system elements to receive updates on the activities of cooperating elements is reduced. For example, if each system element achieves goals assigned thereto in accord with constraints received in association with the goals, cooperative processing is assured. In other words, in an architecture wherein a first or supervisory element (e.g., 170, 180, 108, 110, 112, 114) predetermines cooperative goals and constraints for a plurality of cooperating controllers (possibly including the first or supervisory element) and wherein second or serving elements (e.g., 110, 112, 114, 116) are expected to achieve goals in accord with associated constraints, network traffic may be reduced. While the transmission of some updating information between network elements may be beneficial, a large portion of such network traffic may be eliminated.

In order to allow for cases where second or cooperating elements might not be able to achieve goals according to associated constraints, the method 210 for communicating between a first element and a second element in a system may also include receiving 250 an error message if the second element is not capable of achieving the goal in accord with the constraint.

In architectures that take advantage of the method 210 for communicating between a first element and a second element, the entity or element that requests a control action, or communicates 240 a goal and constraint, might not receive detailed feedback on progress toward the goal unless the commanding entity or element specifically requests the progress or feedback information. Instead, the constraint(s) supplied 240 along with the goal enable the first or requesting entity (e.g., 170, 180, 108, 110, 112, 114) to model the progress of the second or executing controller (e.g., 110, 112, 114, 116). If, for example, a controller (e.g., 108-116) is requested to follow a trajectory (e.g., deliver a workpiece to a series of way points) and also observe constraints specifying a tracking error of less than some threshold, and the system architecture provides for the assumption that the controller will achieve the goal in accord with the constraints, then the requesting entity or element can predict the system's behavior into the future assuming the level of accuracy provided for in the constraint, unless it receives 250 a message to the contrary.

From the point of view of the second element, given not only a goal but also constraints associated with that goal, the second element has information about how free it is to achieve that goal. For instance, the constraints may be an encoding of the context in which the controller is operating. This context information eliminates or reduces the need for updated status information regarding activities or progress of cooperating controllers.

In this regard, some embodiments of the method 210 between a first element and a second element in a system include tracking 260 progress toward the goal and/or relaying 270 progress information between system elements.

As indicated above, tracking 260 progress toward the goal can include maintaining an observer model based on the communicated 240 goals and constraints. Alternatively, the first or second element may request or subscribe to information from other sources.

Figure 3:
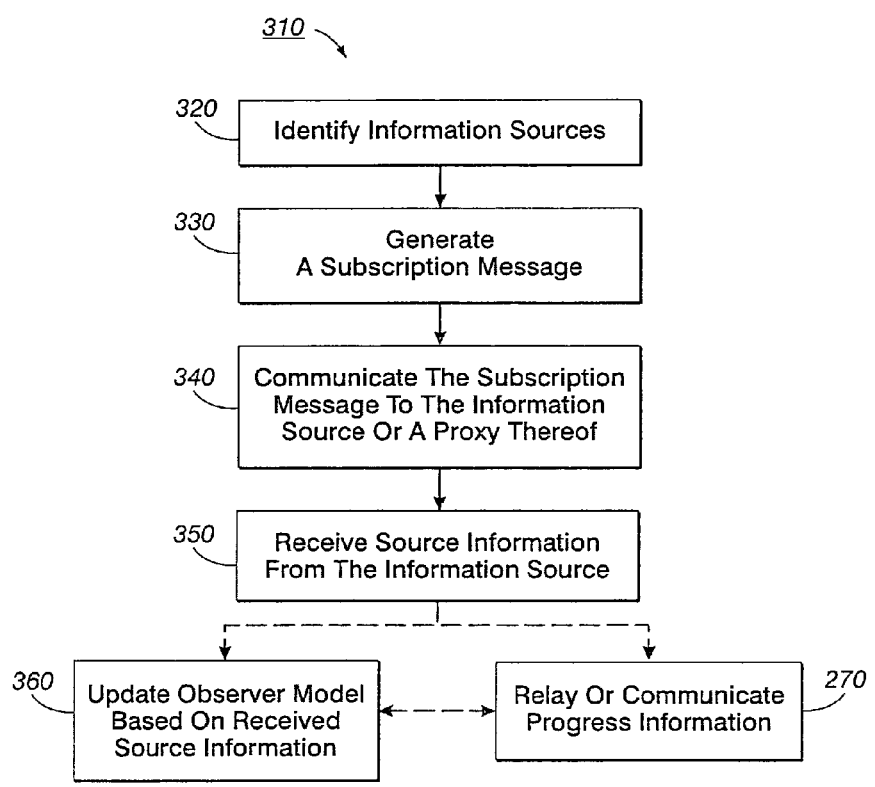
FIG. 3 is a flow chart outlining an additional method of communication between elements.

For example, referring to FIG. 3, a method 310 for communicating between elements of a system may include identifying 320 an information source, generating 330 a subscription message, communicating 340 the subscription message to the identified information source, or to a proxy thereof, and receiving 350 the information requested in the communicated 340 subscription information from the information source or from the proxy of the information source.

Identifying 320 an information source can include identifying an element or entity, such as a controller (e.g. 108-116) or a sensor (e.g., 124-132), that can provide information that would be appropriate or useful to the performance of the task or subtask for which the goal and constraint were determined 220, 230 and communicated 240. For example, where a subtask is related to processing a workpiece, controllers or sensors that can report on a position or speed of a workpiece as it moves through a system, might be identified 320 as information sources.

Generating 330 a subscription message can include assembling identifiers and parameters in a predetermined format for addressing the identified information source, identifying the information desired from the information source and providing some indication as to when information should be provided.

Communicating 340 the subscription message can include transmitting a message over a system network or other communication channel to the identified 320 information source. Alternatively, communicating 340 the subscription message can include transmitting the message to a proxy of the information source. For instance, in some systems sensors are not directly connected to a communications network. Instead, sensors may be directly connected to a controller or processor circuit. In these embodiments, when such a sensor is identified 320, communicating 340 the subscription message may include transmitting the subscription message to the controller or processor circuit associated with, or directly connected to, the identified 320 sensor.

Receiving 350 source information from the information source can include receiving update messages from the identified 320 information source or a proxy thereof. For example, update messages may be received 350 on the basis of a regular time interval. Alternatively, an update message may be received 350 upon the occurrence of an event. For instance, an update may be received 350 if a workpiece passes within the field of view of an identified 320 sensor.

As indicated above with reference to FIG. 2, the received 350 information can be used to update 360 an observer model or be relayed or communicated 270 to another element. For example, a received 250 error message may be relayed or communicated 270 to a higher level system element (e.g., 160). Additionally, or alternatively, relaying or communicating 270 progress information can include transmitting the received 350 source information to another element, such as a second or cooperating controller. Updating 360 an observer model can include fine tuning or updating a command based model according to the received 350 source information. Alternatively, updating 360 the observer model can include maintaining the observer based solely on the received 350 information. Relaying or communicating 270 progress information can include transmitting information from an observer model whether it is based solely on communicated 240 goals and constraints, on a combination of such commands and received 350 source information or solely on knowledge of the modeled system elements and received 350 source information.

An interface, protocol and language supporting the methods 210, 310 for communicating between elements in a system is described below.

Coordination Mode Framework

In a flexible, distributed system (e.g., 104), it may often be desirable for the controllers to have more than one way to interact. For example, there may be times when it is sufficient for the controllers (or some of them) to behave independently, and conserve communication bandwidth. At other times, it may be essential for them to communicate and coordinate their actions, either through peer-to-peer communication or via communication with a centralized entity (e.g., 170, 180). It is useful to think of different levels and types of coordination as distinct modes of operation. The following are examples of types of modes:

independent control: The controller (e.g., 110, 112, 116) uses its own sensors (e.g., 126, 128, 132) and/or observer model to perform control, and doesn't coordinate with any other agent.

master or supervisory control: The controller (e.g., 170, 180, 108, 110, 112, 114) uses its own internal knowledge as above to determine 220, 230 goals and constraints, and communicates 240 the goals and constraints to another element (e.g., 110, 112, 114, 116), thereby explicitly dictating the actions of the other agent or element.

slave, serving or cooperating element: The controller (e.g. 110, 112, 114, 116) uses control signals coming from a master or supervisory controller (e.g., 108, 110, 112, 114, 116, 160, 170, 180).

open-loop: The controller (e.g., 108, 110, 112, 114, 116) follows a goal from a first or supervisory element, such as a set velocity profile, which may be, for example, a constant velocity, with no feedback communicated to the supervisory element, or no feedback communicated as long as control is maintained within a specified 240 constraint (e.g., envelope or range). If for some reason the constraint is violated, the controller may communicate an error or exception message that is to be received 250 by a supervisory element (e.g., 160, 170, 180, 108, 110, 112, 114, 116).

shared-feedback control: The controller (e.g., 108, 110, 112, 114, 116) executes its own feedback control, including observer model 260 updates, but receives feedback (sensory) information sent or relayed 270 from elsewhere (e.g., 110, 112, 114, 116, 170, 180, 124, 126, 128, 132) and also sends its own sensor information elsewhere (e.g., 110, 112, 114, 116, 170, 180, 124, 126, 128, 132, 108).

shared-state control: The controller (e.g., 108, 110, 112, 114, 116) executes its own control algorithm but receives 260 observer model state information from elsewhere (e.g., 110, 112, 114, 116, 170, 180, 124, 126, 128, 132, 108) and sends 270 its sensor data (e.g., 124, 126, 128, 132) elsewhere (e.g., 110, 112, 114, 116, 170, 180, 124, 126, 128, 132, 108). This corresponds to embodiments that include a centralized observer model maintained in, for example, a coordinator (e.g., 170, 180) or supervisory element (e.g., 160).

synchronized-state control: The controller (e.g., 108, 110, 112, 114, 116) executes 260, 360 its own control and observer model but receives time-stamped state reset signals (and sensor signals) from elsewhere (e.g., 110, 112, 114, 116, 170, 180, 124, 126, 128, 132, 108), and communicates 270 its own internal state (and sensor (e.g., 126, 128, 132, 124) data) elsewhere (e.g., 110, 112, 114, 116, 170, 180, 124, 126, 128, 132, 108).

Different types of messages need to be passed between controllers (e.g., 108, 110, 112, 114, 116) and between controllers (e.g., 108, 110, 112, 114, 116) and coordinators (e.g., 170, 180) in the different modes. The mode in which a controller is operating may be communicated explicitly to other modules involved in the coordination effort, or it may be inferred from the types of messages passed. For example, a command 240 for a controller (e.g., 108, 110, 112, 114, 116) to follow a particular control profile (i.e., goal and/or constraint) implies that the controller (e.g., 108, 110, 112, 114, 116) must switch into the slave mode. A master or supervisory controller (e.g., 110, 112, 114, 116, 108) or coordinator (e.g., 170, 180) may need to know (either explicitly or implicitly) which controllers of a system can operate in which modes before the controller or coordinator can communicate 240, 250, 260, 270, 340, 350 with them in those modes.

Protocol Specification

Within each mode of operation, a controller may need to exchange (e.g., 240, 250, 260, 270, 340, 350) messages with other controllers. These messages may fall into two classes: commands 240 and publish/subscribe 250, 260, 350, 270, 340 messages.

Commands (e.g., 240)

Commands include a command type, a command ID, a command specification, and a command time. Command specifications include:

Capability: A token or other identifier identifying the action being commanded, such as "move."

Goals: Conditions that are desirable to achieve. Goals can be viewed as "soft" constraints. One example of a goal (or objective) is a trajectory to track. Note that controllers may have additional internal goals, such as to minimize jerk or acceleration, or to minimize wear.

Constraints: Requirements that must be met. Constraints are hard or strict requirements. Examples include error bounds or time windows on a trajectory and acceleration or velocity limits imposed from outside (due to coordination requirements).

A controller may also have internal constraints, such as actuation limits, that it must observe. The internal and external constraints may fit into the same context and be treated identically internally.

Publish/Subscribe (e.g., 250, 260, 270, 340, 350)

Subscriptions and updates to sensory and state information. This category includes such information as sensor data, observer or controller state data, and changed controller capabilities.

In this framework, the receipt of a communicated 240 command implies a commitment to fulfill that command. Should the controller receiving the communicated 240 command (goal and/or constraint) not be able to fulfill the command, the controller is expected to send an error message for reception 250 by the commanding entity (e.g., see "break" command below; this is a special form of the command class of messages). This error or exception message may be sent as soon as an infeasible command is received, or after partial execution of the command reveals a problem. No other regular feedback is expected except through the vehicle of the publish/subscribe messages. Thus, it is useful for the commanding entity to specify error bounds around the goals as constraints in the command message; these constraints serve as cutoffs outside of which the controller will generate an error. Additional protocols, such as the Propose-Accept-Commit (PAC) protocol, protocols for defining changes in controller capabilities, or additional "management" protocols, may be also be included in this protocol framework.

Messaging Interface

Commands (e.g., 240)

The minimal message interface for a command is as follows:

<Command Type, Command ID, Command Spec, Command Time>

A basic implementation of each of the fields is described below.

Command Type: <type>

The Command Type field defines what type of command it is. Examples include:

set (sets a goal; can also be used for both proposing and committing to goals)

replace (replaces a previous goal)

cancel (cancels a previous goal)

break (reports a broken commitment)

accept/reject (responds to a PAC (propose-accept-commit protocol) request)

Command ID: <number, sender> or <unique number>

The Command ID gives a unique identifier to the command. In it, the sender can be specified explicitly or be encoded into an ID number, if desired.

Command Spec: <capability, goals, constraints>

The Command Specification field defines the requested capability, goals, and constraints. A capability is a token indicating what action is being commanded, such as "move," "moveLeft2Right," or "printSimplex". Goals and constraints are defined by relations over defined variables:

Goals: <relation type, reference variable, reference value> (see 220)

Examples include:

Reference value, the objective x=r:

<=, x, r>

Linear segment, a reference trajectory for variable x:

<lseg, x, <$x_0$, s>>

Here, $x_0$ is the starting value for variable x, and s is the slope of the linear segment to track.

Cubic spline, a reference trajectory for variable x:

<cspline, x, <$x_0$, $a_1$, $a_2$, $a_3$>>

Here, $x_0$ is the starting value for variable x, and $a_1$, $a_2$, and $a_3$ are the coefficients of the cubic spline.

Goal list: <list, relation type, reference variable, <reference value, time>, <reference value, time>, . . . >

A list of goals with times. The goals follow one after the other. Examples:

<list, =, x, <$r_1$, $t_1$>, <$r_2$, $t_2$>, . . . >

In this example, the values for x in between the time points $t_1$, $t_2$, . . . are left undefined.

<list, lseg, x, <<$x_0$, $s_1$>, $t_1$>, <<$x_1$, $s_2$>, $t_2$>, . . . >

This list would be interpreted as a piecewise linear trajectory to track:

$$x = \begin{cases} x_0 + s_1(t-t_1), & t_1 \leq t < t_2 \\ x_1 + s_2(t-t_2), & t_2 \leq t < t_3 \\ \vdots \end{cases}$$

Constraints: <relation type, reference variable, lower bound, upper bound> (see 230)

This is a simple formulation for basic equality and inequality constraints.

Examples:

Simple range constraint

<=, x, lb, ub>

This specifies that the variable x should be within the bounds specified during the time range specified in the command time fields (see below).

Linear segment constraint:

<lseg, x, <$x_{0lb}$, $s_{lb}$>, <$x_{0ub}$, $s_{ub}$>>

This specifies two linear segments as lower and upper bounds.

Constraint list: <list, relation type, reference variable, <lower bound, upper bound, time>, <lower bound, upper bound, time>, . . . >

A list of constraints with times. The constraints follow one after the other.

An example:

<list, lseg, x, <<$x_{1lb}$, $s_{1lb}$>, <$x_{0ub}$, $s_{1ub}$>, $t_1$>, <<$x_{1lb}$, $s_{2lb}$>, <$x_{1ub}$, $s_{2ub}$>, $t_2$>>

Command Time: <start, duration>

Other types of time or duration specification (such as sensor-based, etc.) are possible. Their specification is left for a later version of this protocol. For "break" messages, this field can be used for a time-stamp.

Publish/Subscribe (e.g., 250, 260, 270, 340, 350)

The basic interface for publish/subscribe messages is:

<Action Type, Command ID, Sub/Pub Specification, Sub/Pub Time>

The fields are described as follows:

Action Type: <type>

Action types include:

subscribe (subscribe to a variable)

cancel (cancel a subscription)

update (publish a variable update)

Command ID: <number, sender> or <unique number>

This is the same as for command messages. The Command ID gives a unique identifier to the command. In it, the sender will be specified explicitly or will be encoded into an ID number.

Sub/Pub Specification: <reference variable, specification>

For subscription messages (e.g., 340), this would typically be:

<reference variable, lower bound, upper bound>

The lower and upper bound fields are used to specify values beyond which the sender should be notified of changes in the reference variable. If a subscriber wants to be notified of every change, the bounds can be set to create an empty set, e.g., [1, −1].

For publication (update) messages, just the value would typically be specified:

<reference variable, value>

Sub/Pub Time: <start, duration>

Again, other types of time specification are possible. This field can be used for time-stamping in the update action.

Typical Use Scenarios

This section describes some typical ways in which this messaging protocol can be used. "↓" represents "downward" communication (e.g., 240) (e.g., from a first or supervisory element to a second or cooperating element) in a hierarchical control architecture, while "↑" represents "upward" communication (e.g., from the second or cooperating element to the first or supervisory element).

Scenario 1: normal operation, shared sensor data set↓: command entity (first or supervisory element) issues 240 an action command subscriber↑: controller (second, serving or cooperating element) subscribes (requests information communication 270) to feedback updates from command entity (first or supervisory element)

subscriber↓: command entity subscribes 260, 340 to sensory variable update↑: update 260, 350 on sensory variable update↓: update 270 from command entity to controller update↑: update 260, 350 on sensory variable
update↓: update 270 from command entity to controller
Scenario 2: faulty operation
  set↓: command entity issues 240 an action command
  break↑: commitment to execute command is broken 250
  replace↓: command entity replaces 240 action command
Scenario 3: normal operation, PAC (propose-accept-confirm) protocol
  set↓: command entity proposes 240 an action
  accept↑: action is accepted 260
  set↓: command entity commits to the action These scenarios may involve a centralized command entity (e.g., 170, 180), which may give commands to multiple other entities (e.g. 112, 114, 116 and 108, 110, 112 respectively), or may involve peer entities (e.g., 108, 110, 112, 114, 116) giving commands to each other.

Message Examples

In this section, we present a few examples of what typical messages would look like.

Simple Transport Command Message

This message is used to convey 240 a simple request for movement from one point to another, starting at a particular time and having a particular duration. A specific example follows:

```
<
    set,                    command type
    cmdID,                  command ID
    <                       command spec
        move,               capability
        <>,                 goals
        <>                  constraints
    >,
    <
        t_s,                command time
                            start time
        t_d,                duration
    >
>
```

Velocity Command Message

This message would be used to convey 240 a velocity command from a master controller to a slave. A specific example (note that v is a named variable known to both sender and receiver, while $r_v$ and $\delta_v$ as well as $t_s$ and $t_d$ stand for constants in an actual call; similarly, cmdID stands for a unique command identifier, e.g., a number, and the meaning of set and move is known to both sender and receiver):

```
<
    set,                         command type
    cmdID,                       command ID
    <                            command spec
        move,                    capability
        <=, v, r_v>,             goals
        <=, v, r_v-δ_v, r_v+δ_v>  constraints
    >,
    <
        t_s,                     command time
                                 start time
        t_d                      duration
    >
>
```

Trajectory Command Message (240)

A trajectory is typically defined by a set of position/time points. Alternate approaches to trajectory generation 220, 230, such as using splines, could specify trajectories by other parameters. The constraints might include acceptable error bounds for the trajectory tracking. A specific example:

```
<
    set,                                                                    command type
    cmdID,                                                                  command ID
    <                                                                       command spec
        move,                                                               capability
        <list, Iseg, x, <<x_0, s_1>, t_1>, <<x_1, s_2>, t_2>,               goals
            <<x_2, s_3>, t_3>, <<x_3, s_4>, t_4>>,
        <list, Iseg, x, <<x_{0lb}, s_{1lb}>, <x_{0ub}, s_{1ub}>, t_1>,      constraints
            <<x_{1lb}, s_{2lb}>, <x_{1ub}, s_{2ub}>, t_2>, <<x_{2lb}, s_{3lb}>, <x_{2ub}, s_{3ub}>, t_3>,
            <<x_{3lb}, s_{4lb}>, <x_{3ub}, s_{4ub}>, t_4>>
    >,
    <                                                                       command time
        t_s,                                                                start time
        t_d                                                                 duration
    >
>
```

Sensor Data Message

This message is used for publishing 260, 270 sensor data. An example using a position variable:

```
<
    update,             action type
    cmdID,              command ID
    <                   publication spec
        x_s,            reference variable
        0.0347          value
    >,
    <timeStamp,0>       publication time
>
```

Implementation Issues

An implementation issue is that of levels of compliance with the protocol and interfaces. For example, a fully compliant controller is expected to be able to incorporate various types of constraints and monitor its own performance relative to them. If the controller breaks its commitment (violates the constraints), it is expected to send a "break" message to be received 250 by the entity that sent 240 the command. One can envision, however, controllers with intermediate levels of capabilities, both in terms of protocol and in terms of language. We define the different levels of capabilities as follows:

Levels of protocol capabilities:
1. Controller ignores constraints and never reports violated constraints
2. Controller ignores constraints in its control, but reports violations
3. Controller incorporates constraints in its actions and attempts to satisfy them, but does not report violations
4. Controller both incorporates constraints and reports violations Levels of language/control capabilities:
1. Controller cannot handle constraints, can handle simple equality objectives
2. Controller can accept equality objectives and constraints
3. Controller can accept multiple equality objectives (lists) and lists of equality constraints
4. Controller can accept time-varying constraints
5. Controller can handle more complex expressions, such as splines, in the objectives or constraints As discussed above, in order to impose goals and constraints on a controller, it is useful for the entity sending 240 the message to have a way of knowing if the receiving module will be able to achieve what is asked of it. One way to achieve this is for the sending agent or element to have a model of the controller to which it is sending goals and/or constraints. Another way to provide capabilities information regarding a second or cooperating element to a first or supervisory element is for the elements to use a Propose-Accept-Confirm (PAC) type protocol. One variation on this method is for the first or supervisory element to have generic or default controller models which are augmented or fine tuned through the use of a PAC protocol. In these embodiments, requests 240 are rejected 250 only infrequently. PAC handshaking could be added on top of any of the messages described above. Another approach to this problem is to have capabilities be pulled from serving controllers; when a commanding entity needs to know what an element is capable of, for example, the first, supervisory or commanding entity or element could request the capabilities of the second, serving or cooperating element from that element.

Application Scenarios

This section addresses in more detail the application of the above protocol and interface to the problem of module-module sheet transfer in a modular, tightly coupled printer.

Figure 4:
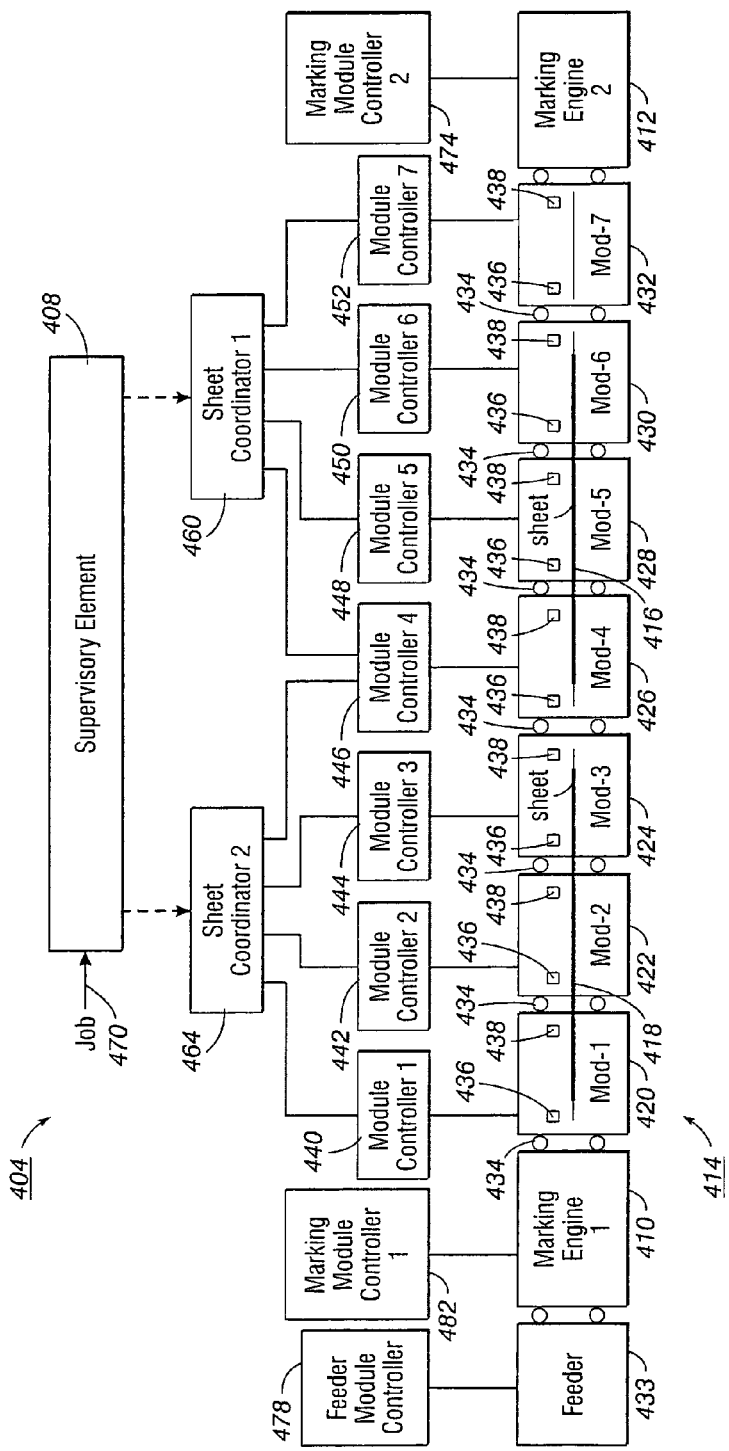
FIG. 4 is a block diagram of a document processing system wherein elements of the system may communicate according to the methods of FIG. 2 and/or FIG. 3.

Referring to FIG. 4, an embodiment of a document processing system 404 includes a high level element 408, a first marking engine 410, a second marking engine 412 and a transportation system 414.

For example, the first and second marking engines 410, 412 may be xerographic marking engines. Alternatively, one or more marking engines of an embodiment may be of other technologies, such as, but not limited to, ink jet marking technology.

The transportation system 414 transports print media such as a first sheet 416 and a second sheet 418 between the first marking engine 410 and the second marking engine 412. In the illustrated system 404, the transportation system includes a plurality of transport modules. For instance, the plurality of transport modules includes a first, second, third, fourth, fifth, sixth and seventh transport module 420, 422, 424, 426, 428, 430, 432. The system 404 may include additional modules. For example, the additional modules may include a media or paper feeder 433, which delivers sheets of print media or paper to one or both of the marking engines 410, 412. Additional modules (not shown) may transport print media from either or both marking engines 410, 412 to other devices, including, but not limited to, additional marking engines and/or output devices such as paper trays, stackers, collators, staplers and other binders. Furthermore, the plurality of transport modules may form paths that branch off from the illustrated path (420, 422, 418, 424, 426, 430, 432) to transport sheets to other marking engines (not shown) or other devices.

In the illustrated document processing system 404, each transport module 420-432 includes transport actuators. For example, the transport modules 420-432 include motor driven nips 434 for driving or urging print media through the transport system 414. Additionally, or alternatively, the modules 420-432 may include flippers or gates for redirecting print media toward other portions (not shown) of the transportation system 414. Furthermore, the modules may include other kinds of transport actuators. For instance, air jets and/or spherical nips may be included in the transport modules (e.g., 420-432). For the purposes of illustration, the modules of FIG. 4 are associated with the nips 434 depicted to their left. The transport modules 420-432 of the document processor system 404 include sensors. For instance, the sensors may be sheet presence or position sensors. As illustrated, each module 420-432 includes a left side sensor 436 and a right side sensor 438.

Each transport module 420-432 also includes or is associated with a respective module controller 440, 442, 444, 446, 448, 450, 452. For example, the module controllers 440-452 control the actions of the transport actuators of their respective modules 420-432 and receive and relay information from their respective sensors 436, 438.

The high level element 408 is operative to generate sheet processing task descriptions or itineraries describing respective sheet processing tasks, to activate respective sheet coordinators (e.g., a first sheet coordinator 460 and a second sheet coordinator 464) and to communicate the respective sheet processing task descriptions to the respective sheet coordinators (e.g., 460, 464). For example, the high level element 408 receives a job description 470. The job description 470 may include descriptions of sheets or pages. The descriptions may include images, or references to images stored elsewhere and indications as to an order in which the images are to appear on sheets of print media. For example, the job description 470 includes page description language describing text and fonts and graphic items as well as their location on particular pages of a document. The high level element 408 activates, instantiates or spawns a sheet coordinator for each sheet or page (a sheet may have two sides and may, therefore, comprise two pages). The high level element 408 analyses the job description 470 and may schedule or plan operations to create the document described in the job description 470. In so doing, the high level element 408 generates respective sheet processing task descriptions or itineraries for the transportation and processing of sheets between system resources.

For instance, regarding the transportation of a sheet between system resources, an example itinerary or sheet processing task description may have the following form:

Itin 1 1 11
feeder1 feed 19.544
me1 print image27 20.201
m1 left2right 23.341
m2 left2right 23.495
m3 left2right 23.625
m4 left2right 23.755
m5 left2right 23.885
m6 left2right 24.015
m7 left2right 24.145
me2 print image28 24.275
finisher1 stack 27.415

The first line is, for example, an itinerary or sheet processing task description identifier. The rest of the itinerary specifies, for example, that a component named feeder1 (e.g., 433) should feed a sheet at time 19.544, then a component named me1 should execute a print action on an image named image27 at a later time, then a component named m1 should execute an action (move the sheet left to right) at a later time, and so on.

The respective sheet coordinators (e.g., 460, 464) are operative to receive the respective sheet processing task descriptions or itineraries and, based on those respective descriptions, identify a plurality of respective sheet processing subtasks to be performed in order to complete the respective sheet processing tasks, identify respective controllers for controlling respective process actuators to perform the respective sheet processing subtasks, generate and determine (e.g., 220, 230) respective goals and constraints for performing the respective sheet processing subtasks and communicate (e.g., 240) the respective goals and constraints to the respective module controllers as appropriate to the respective subtasks. Additionally, the respective sheet coordinators (e.g., 460, 464) may identify respective information sources that are able to provide progress information regarding the performance of the respective subtasks, collect (e.g., 260, 350) the respective progress information from the respective subsets of information sources and communicate (e.g., 270)

the respective progress information to the respective module controllers as appropriate to the respective sheet processing subtasks.

For example, the information sources may include the sensors 436, 438. Additionally, or alternatively, the module controllers (e.g., 440-452, 474-482) themselves may maintain observer models or estimators of the progress of respective subtasks. Such models are referred to as sheet observer models. In this regard, the module controllers or the estimates or models of the module controllers may be considered information sources.

For instance, in the illustrated document processing embodiment 404, subtasks for a first sheet may have included generating 220, 230 goals and constraints for matching a speed of nips 434 of the first module 420 to a speed of a sheet exiting the first marking engine 410 and receiving the first sheet 416 therefrom. A second subtask might have been for nips 434 of the second module 422 to match the speed of the first sheet 416 as it exited the first module 420. A subtask of the third module 424 may have been to match the speed of the first sheet 416 as a leading edge thereof exited the second module 422. Yet another subtask may have been for the nips 434 of the first, second and third modules 420, 422, 424 to accelerate or to begin to accelerate the first sheet 416 to a higher transportation system 414 transport speed.

Additional subtasks associated with the fourth, fifth and sixth modules 426, 428, 430 may have included matching associated nip 434 speeds to the speed of the first sheet 416 as it entered each module 426, 428, 430 and/or continuing to accelerate the sheet 416. The first sheet coordinator 460 determines 220, 230 goals and constraints for each of these subtasks and generates related command messages according to the protocol described above.

The transfer or movement of a sheet from module to module must be done in a coordinated manner. In the document processing embodiment 404, the modules 410, 412, 420-433 are tightly coupled by their relationship to a sheet. For example, at any given point in time, a plurality of modules may be in contact with the same sheet. If the nips 434 of modules contacting a sheet are driven at different speeds or with different rates of acceleration or deceleration, the sheet (e.g., 416, 418) may be damaged or distorted in a manner that causes a jam in the transportation system 414 or system 404 as a whole. The sheet coordinators (e.g., 460, 464) ensure cooperative or coordinated actuation of the actuators or modules (e.g., 410, 412, 420-433) by determining 220, 230 cooperative or coordinated goals and constraints. For example, at the instant depicted in FIG. 4, the first sheet 416 is in contact with portions of the fourth, fifth and sixth modules 426, 428, 430. The first sheet coordinator 460 is shown in communication with the fourth, fifth, sixth and seventh module controllers 446-452. For example, the first sheet controller 460 may be sending 240 goals and constraints to the fifth and sixth module controllers 448, 450 that result in the fifth and sixth modules 428, 430 driving the first sheet 416 in a cooperative manner. For instance, the fifth and sixth module controllers 448, 450 may be sent 240 determined 220, 230 goals and constraints describing trajectories or velocity profiles that direct the fifth and sixth module controllers 448, 450 to drive their respective nips 434 at progressively slower speeds, thereby directing the fifth and sixth module controllers to begin decelerating the first sheet 416. Additionally, the first sheet coordinator 460 may be requesting or receiving sensor information or sheet observer model information communicated or relayed 270 from the fourth module controller 446. For instance, the first sheet coordinator 460 may be requesting, through generated 330 and communicated 340 subscription commands, to be notified when a trailing edge of the first sheet 416 passes the left sensor 436 of the fourth module. Additionally, the first sheet coordinator 460 may be asking for (subscribing) 340 or receiving (published) 350 sensor information from the sixth module 430. For instance, the first sheet coordinator 460 may be requesting 340 to be notified when a leading edge of the first sheet 416 passes or enters a field of view of the right sensor 438 of the sixth module.

This sensor information may be relayed 270 by the sheet coordinator to the seventh module controller 452 through the use of publish messages. Additionally, or alternatively, the first sheet coordinator 460 may update 260, 360 a model, such as a world observer model of the task or of the subtasks, based on the information received 350 from the identified 320 information sources or sensors (e.g., 436, 438).

In addition to possibly relaying 270 sensor information, the first sheet coordinator 460 may be determining 220, 230 goals and constraints and sending 240 commands, including the goals and constraints, directing the seventh module controller 452 to prepare the seventh module 432 to receive the first sheet 416. For instance, the seventh module controller 452 may be directed to drive nips 434 of the seventh module 432 at a speed compatible with the speed of the first sheet 416 as the leading edge thereof exits the sixth module 430. The first sheet coordinator 460 may also be transmitting 240 goals and constraints to the fourth module controller 446 releasing it from service or subtasks related to the transportation of the first sheet 416. Alternatively, prior messages may have included an expiration event, such as a time limit or sensor reading, the occurrence of which automatically deactivates or releases the fourth module controller from services related to the first sheet 416.

At a point later in time than the instant depicted in FIG. 4, the first sheet 416 may enter the second marking engine 412 for processing. For example, the second marking engine may be used to print an image on a second side of the first sheet or may apply color markings that the first marking engine 410 did not apply. At that later point in time, the first sheet will no longer be in contact with the fourth module 426 and the trailing edge of the first sheet will be about to exit the fifth module 428. The fourth module controller 446 may have already been released (as described above) from subtasks associated with processing the first sheet 416 and may have begun performing subtasks associated with processing the second sheet 418. The fifth module controller 448 may be about to be similarly released.

The sixth and seventh transport modules 430, 432 and the second marking engine (or module) 412 are likely all in contact with the first sheet 416. Therefore, the first coordinator 460 is generating or has generated (e.g., 220, 230) and will communicate or has communicated (e.g., 240) goals and constraints for the sixth and seventh transport modules 430, 432 and the second marking engine 412 or a marking engine module controller 474. The goals and constraints are cooperative in nature. For example, the transport modules 430, 432 may be directed to slow the sheet to a speed compatible with capabilities of the marking engine 412. Additionally, goals and constraints for the second marking engine controller 474 may direct it to control the second marking engine 412 to accept the first sheet at the compatible speed and to place specified marks on portions of the first sheet 416. As the first sheet 416 continues into the second marking engine 412, the sixth and seventh module controllers 450, 452 will be released from subtasks associated with the first sheet 416, or deactivated. Eventually, the first sheet 416 will exit the second marking engine or module 412 and be delivered to other modules (e.g., transport modules, finishers, stackers and/or other print engines). The first coordinator will continue to send 240 appropriately determined 220, 230 goals and constraints via command messages 240 to the subsequent modules, subscribe 340 to progress information, relay 270 or communicate the progress information (as appropriate) via publish messages and release or deactivate controllers, in the sequential manner described above, until the task described in the task description, or itinerary, received when the first coordinator 460 was activated, is completed. When the task is completed, the first coordinator 460 may be deactivated.

Similar processing occurs with regard to the second 464 and subsequent (not shown) coordinators and the second 418 and subsequent (not shown) sheets. For example, as depicted in FIG. 4, the second sheet 418 is within the first, second and third modules 420, 422, 424. The second sheet coordinator 464 is depicted as in communication with the first, second, third and fourth module controllers 440-446. For example, the second sheet coordinator 464 may be directing 240 the second and third module controllers 442, 444 to drive the second sheet 418 at the same speed and/or with the same acceleration through the determination 220, 230 of appropriate goals and constraints and communication 240 via command messages as described above, receiving 350 or requesting 340 sensor information from the sensors 436, 438 of the first module 420 and/or the third module 424 through the generation 330 and communication 340 of subscribe messages, releasing the first module controller 440 from tasks associated with transporting the second sheet 418, and/or directing 240 the fourth module controller 446 to prepare to receive the second sheet 418 by driving nips 434 of the fourth module 426 at a speed appropriate to, or compatible with, a speed of the second sheet 418, as a leading edge thereof exits the third module 424 and enters the fourth module 426, via command 240 messages as described above. As the sheets 416, 418 are transported through the system 404, the sheet coordinators 460, 464 deactivate or release module controllers no longer processing their respective sheets and send commands 240 to downstream controllers preparing them to receive their respective sheets.

In summary, in order to schedule and coordinate transfers across modules (e.g., 433, 410, 420, 422, 424, 426, 428, 430, 432, 412), the following typical functionalities are employed:
1. distributing trajectories (e.g., through the communication of cooperative goals and constraints in—set—command messages)
2. sharing sheet state (or sensor information) through the communication of subscribe and publish messages
3. sharing controller state through the communication of subscribe and publish messages
4. commanding or coordinating agreed transfer velocities (e.g., through the communication of cooperative goals and constraints in—set—command messages)

Not all implementations contain all of these functionalities. The framework described above can be used to implement these activities. The mode formulation includes a number of natural ways of thinking about module-module handoff. The mode formulation can be used both in the case where modules talk directly to one another to perform coordination and in the case where module-module coordination is brokered by coordinating controller (e.g., 170, 180, 460, 464) or other centralized entity. The protocols would be the same, but knowledge about the machine might reside in different places. A few examples of the way this framework could be used are given below.

Case 1: Few Controller Coordination Times; Master-Slave Coordination

In a case where the ratio of time spent on events under the control of an individual module controller to time spent on events under the control of multiple module controllers is large (loosely integrated system), most of the time a module might be operating in the "independent sheet control" mode similar to the "independent" mode described above, where no communication to other modules is required. However, when, for example, a sheet (e.g., 416, 418) is in two or more modules at once, coordination is necessary. One approach is to have master-slave type coordination. When the sheet is about to enter the next module, a controlling module (e.g., 448/428) would go into "master sheet control" mode, and would initiate coordination with a downstream module (e.g., 450/430). The controlling module (e.g., 448/428) would send 240 a command message including cooperative goals and constraints, to the downstream module, giving it a fixed velocity to track and implicitly placing the downstream module (e.g., 450/430) in slave mode. The slave mode could be ended with a "cancel" message or the velocity command could have fixed time duration. If there is a sequence of velocities to command, the "velocity command" message could take the form of a list, or the controlling module could simply send 240 "replace" commands with the new velocities, depending on the speed of the network and the desired degree of coordination. Three examples of the possible protocols followed are given below.

upstream downstream: velocity command 240 message, when the sheet is about to enter the downstream module:

<set, cmdID1, <move, <=, v, $r_v$>, <v, $r_v-\delta_v$, $r_v+\delta_v$>>,<$t_s$, $t_d$>>

Here, $t_s$ would be some time shortly into the future, and $t_d$ would indicate the span of time that the sheet is expected to be in the two modules. This example would not require a "cancel" message.

upstream→downstream: sequence of velocity command 240 messages, beginning when the sheet is about to enter the downstream module:

<set, cmdID1, <move, <=, v, $r_{v1}$>, <v, $r_{v1}-\delta_v$, $r_{v1}+\delta_v$>>,<$t_s$, $t_d$>>

<replace, cmdID1, <move, <=, v, $r_{v2}$>, <v, $r_{v2}-\delta_v$, $r_{v2}+\delta_v$>>,<$t_s$, $t_d$>>

<replace, cmdID1, <move, <=, v, $r_{v3}$>, <v, $r_{v3}-\delta_v$, $r_{v3}+\delta_v$>>,<$t_s$, $t_d$>>

<replace, cmdID1, <move, <=, v, $r_{v4}$>, <v, $r_{v4}-\delta_v$, $r_{v4}+\delta_v$>>,<$t_s$, $t_d$>>

The $t_s$ and $t_d$ could be the same for all four messages, and reflect the start time and duration that the sheet was expected to be in both modules.

upstream→downstream: a velocity command 240 message and a request 340 for feedback 350 about when the sheet is completely within the downstream module:

<set, cmdID1, <move, <=, v, $r_v$>, <v, $r_v-\delta_v$, $r_v+\delta_v$>>,<$t_s$, $t_d$>>

<subscribe, cmdID2, <$x_{relative}$, 0, sheetlength>, <timestamp1, $t_d$>>

The variable $x_{relative}$ corresponds to the downstream controller's estimate of the sheet's position inside the downstream module, and the bounds indicate that the downstream module should let the upstream module know as soon as it believes the sheet to be more than a sheet length inside it. The upstream module receives 350 this message from the downstream module:

downstream→upstream: feedback message:

<update, cmdID3, <$x_{relative}$, sheetlength+$\epsilon$>, <timestamp2>>

Finally, the upstream module ends the velocity command and the subscription:

<cancel, cmdID1, move, <<=, v, $r_v$>, <v, $r_v-\delta_v$, $r_v+\delta_v$>>, <$t_s$, $t_d$>>

<cancel, cmdID2, <$x_{relative}$, 0, sheetlength>, <timestamp1, $t_d$>>

Case 2: Many Controller Coordination Events; Coordinating Controller-Based Hypermodular Coordination In a tightly coupled system where there are many module controller coordination events (e.g., because of small modules relative to sheet size, when the sheet may always be in multiple modules at once), module-module transfer is the norm rather than the exception. In this case, as illustrated in FIG. 4, an approach is to have a centralized coordinating controller (CC) (e.g., 170, 180, 464, 460) for each task or workpiece (e.g., sheet) that brokers all data sharing among the modules. All modules acting on or about to act on a given sheet communicate with that coordinating controller. The coordinating controller subscribes 340 to sensor data variables for all modules, so that when a module received sensor data, it would send a "sensor data" message, as above, to the coordinating controller. The modules in turn subscribe 340 to sensor data from the coordinating controller, so that the coordinating controller sends 270 sensor update messages to all the modules involved with the sheet. This update message can include an "apply time" for sensor data in the time field. When a new module controller is about to interact with the sheet, the coordinating controller might initialize it by sharing observer state data with it through another type of update message. A sample protocol for this scenario is given below.

CC→MC: <subscribe, cmdID1, <sensorValues, oldSensorValues, oldSensorValues>, <$t_s$, $t_d$>>

CC→MC: <set, cmdID2, <move, <list, Iseg, x, <<$x_0$, $s_1$>, $t_1$>, <<$x_1$, $s_2$>, $t_2$>, <<$x_2$, $s_3$>, $t_3$>, <<$x_3$, $s_4$>, $t_4$>>, <list, Iseg, x, <<$x_{0lb}$, $s_{1lb}$>, <$x_{0ub}$, $s_{1ub}$>, $t_1$>, <<$x_{1lb}$, $s_{2lb}$>, <$x_{1ub}$, $s_{2ub}$>, $t_2$>, <<$x_{2lb}$, $s_{3lb}$>, <$x_{2ub}$, $s_{3ub}$>, $t_3$>, <<$x_{3lb}$, $s_{4lb}$>, <$x_{3ub}$, $s_{4ub}$>, $t_4$>>>, <$t_s$, $t_d$>>

MC→CC: <subscribe, cmdID3, <positionUpdates, oldValues, oldValues>, <$t_s$, $t_d$>>

MC→CC: <subscribe, cmdID4, <observerStateData, 0, 0>, <once>>

CC→MC: <update, cmdID5, <observerStateData, stateData>, <timestamp1>>

CC→MC: <update, cmdID6, <positionUpdates, newValues1>, <timestamp2, $t_{apply1}$>>

CC→MC: <update, cmdID7, <positionUpdates, newValues2>, <timestamp3, $t_{apply2}$>>

MC→CC: <update, cmdID8, <sensorValues, newSensorValues1>, <timestamp4>>

CC→MC: <update, cmdID9, <positionUpdates, newValues3>, <timestamp4, $t_{apply3}$>>

MC→CC: <update, cmdID10, <sensorValues, newSensorValues2>, <timestamp5>>

CC→MC: <update, cmdID11, <positionUpdates, newValues4>, <timestamp5, $t_{apply4}$>>

CC→MC: <update, cmdID12, <positionUpdates, newValues5>, <timestamp6, $t_{apply5}$>>

Case 3: ARTC and ISSC; Mode Switching

Control mode switching, such as between absolute reference tracking control (ARTC) and inter-sheet spacing control (ISSC), also fits into this framework. One approach to implementation would be to specify a trajectory as a goal, but specify a range of spacings from the next downstream sheet as a constraint. This constraint could be added and removed as desired (through "replace" commands). In a hypermodular system, one could thus do ISSC if there were a sheet immediately downstream, but then if that sheet were to split onto a different path, the upstream sheet could switch to ARTC. In an extension of this instantiation, another way of implementing this switching would be to have two goals, one specifying a reference trajectory, and one specifying a tracking distance from a given sheet. The two goals could have associated with them conditions for applicability that would be mutually exclusive and would represent the decision logic for choosing one mode over another.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for communicating between a first element and an identified second element in a distributed system including a plurality of additional elements, the method comprising:

determining, by the first element, contemporaneously with a processing time of a task, at least one goal related to the task to be performed by the identified second element;

determining, by the first element, at least one constraint related to how the at least one goal is to be achieved;

wherein the at least one goal and the at least one constraint are determined by the first element to direct the second element to behave cooperatively with at least one of the plurality of additional elements;

communicating, by the first element, the at least one goal and the at least one constraint to the identified second element, wherein communicating the at least one goal and the at least one constraint comprises:

assembling a message including a command type, a command identifier, a command specification and a command time; and transmitting the assembled message from the first element to the second element; and receiving, at the first element, an error message from the identified second element, in response to the communicated goal and constraint, if the identified second element is not capable of achieving the at least one goal in accord with the at least one constraint and if the identified second element is capable of achieving the at least one goal in accord with the at least one constraint, receiving no feedback message from the identified second element regarding the at least one goal and at least one constraint, thereby conserving communication bandwidth.

2. The method of claim 1 further comprising:

evaluating, by the identified second element, the at least one goal and the at least one constraint in light of capabilities of the second element; and communicating an error message, by the identified second element to the first element, if the evaluation indicates that the second element is not capable of achieving the at least one goal in accord with the at least one constraint.

3. The method of claim 2 wherein evaluating the at least one goal and the at least one constraint in light of capabilities of the second element comprises:
  accessing second element capabilities data based on the at least one goal; and
  comparing the at least one constraint to the accessed second element capabilities data, thereby determining if achieving the at least one goal in accord with the at least one constraint is within the capabilities of the second element.

4. The method of claim 1 further comprising:
  determining an information source able to provide source information that would be useful in achieving the at least one goal; and
  subscribing to the source information.

5. The method of claim 4 further comprising:
  receiving the subscribed to source information; and
  communicating the received source information to the second element.

6. The method of claim 1 further comprising:
  determining status information available from the second element that would be useful in monitoring progress of the second element in achieving the at least one goal;
  subscribing to the determined status information.

7. The method of claim 6 further comprising:
  communicating the subscribed to status information to the first element.

8. The method of claim 1 further comprising:
  determining at least one new goal related to the task to be performed by the second element;
  determining at least one new constraint related to how the at least one new goal is to be achieved;
  communicating the at least one new goal and the at least one new constraint to the second element; and
  receiving an error message if the second element is not capable of achieving the at least one new goal in accord with the at least one new constraint.

9. The method of claim 8 wherein communicating the at least one new goal and the at least one new constraint to the second element comprises:
  assembling a replace message including a command type of -replace-, the command identifier and a replacement command specification selecting a replacement capability of the second element and at least one replacement goal, and indicating at least one replacement constraint on an aspect of how the at least one replacement goal is to be achieved.

10. The method of claim 8 wherein communicating the at least one new goal and the at least one new constraint to the second element comprises:
  assembling a cancel message including a command type of -cancel-, and the command identifier.

11. The method of claim 10 further comprising:
  assembling a new command message including a command type of -set-, a new command identifier and a new command specification selecting a new capability of the second element and the at least one new goal, and indicating the at least one new constraint on at least one aspect of how the new at least one goal is to be achieved.

12. The method of claim 1 wherein determining at least one goal comprises:
  determining, by the first element, a trajectory including a plurality of starting points and ending points in association with respective starting times associated with the starting points.

13. The method of claim 1 wherein determining, by the first element, at least one constraint related to how the at least one goal is to be achieved comprises:
  at least one of determining at least one set of upper and lower bounds for the at least one goal and determining at least one resource allocation for achieving the at least one goal.

14. The method of claim 1 wherein determining, by the first element, the at least one goal and the at least one constraint comprises:
  determining, contemporaneously with a processing time of a sheet of print media, a processing path through a document processing system for the sheet of print media, the path including a first module that is tightly coupled to a second module, whereby for at least a portion of a processing performed by the system both the first module and the second module operate on the sheet at the same time;
  determining respective first and second controllers associated with the first and second modules;
  determining respective cooperative first and second goals and constraints for actions of the first module and the second module upon the sheet;
  communicating the respective first cooperative goal and constraint to the first controller; and
  communicating the respective second cooperative goal and constraint to the second controller, wherein at least one of the first and second controller is the second element.

15. A method for communicating between a first element and an identified second element in a distributed system including a plurality of additional elements, the method comprising:
  determining, by the first element, contemporaneously with a processing time of a task, at least one goal related to the task to be performed by the identified second element;
  determining, by the first element, at least one constraint related to how the at least one goal is to be achieved;
  wherein the at least one goal and the at least one constraint are determined by the first element to direct the second element to behave cooperatively with at least one of the plurality of additional elements;
  communicating, by the first element, the at least one goal and the at least one constraint to the identified second element; and
  receiving, at the first element, an error message from the identified second element, in response to the communicated goal and constraint, if the identified second element is not capable of achieving the at least one goal in accord with the at least one constraint and if the identified second element is capable of achieving the at least one goal in accord with the at least one constraint, receiving no feedback message from the identified second element regarding the at least one goal and at least one constraint, thereby conserving communication bandwidth;
  determining an information source able to provide source information that would be useful in achieving the at least one goal; and
  subscribing to the source information, wherein subscribing to the source information comprises:
  assembling a message including an action type, a command identifier, a subscription specification and a subscription time; and transmitting the assembled message.

16. A method for communicating between a first element and an identified second element in a distributed system including a plurality of additional elements, the method comprising:

determining, by the first element, contemporaneously with a processing time of a task, at least one goal related to the task to be performed by the identified second element;

determining, by the first element, at least one constraint related to how the at least one goal is to be achieved;

wherein the at least one goal and the at least one constraint are determined by the first element to direct the second element to behave cooperatively with at least one of the plurality of additional elements;

communicating, by the first element, the at least one goal and the at least one constraint to the identified second element; and receiving, at the first element, an error message from the identified second element, in response to the communicated goal and constraint, if the identified second element is not capable of achieving the at least one goal in accord with the at least one constraint and if the identified second element is capable of achieving the at least one goal in accord with the at least one constraint, receiving no feedback message from the identified second element regarding the at least one goal and at least one constraint, thereby conserving communication bandwidth;

determining status information available from the second element that would be useful in monitoring progress of the second element in achieving the at least one goal; and subscribing to the determined status information, wherein subscribing to the status information comprises:

assembling a message including an action type, a command identifier, a subscription specification and a subscription time; and transmitting the assembled message.

17. A method for communicating between a first element and an identified second element in a distributed system including a plurality of additional elements, the method comprising:

determining, by the first element, contemporaneously with a processing time of a task, at least one goal related to the task to be performed by the identified second element;

determining, by the first element, at least one constraint related to how the at least one goal is to be achieved;

wherein the at least one goal and the at least one constraint are determined by the first element to direct the second element to behave cooperatively with at least one of the plurality of additional elements;

communicating, by the first element, the at least one goal and the at least one constraint to the identified second element; and receiving, at the first element, an error message from the identified second element, in response to the communicated goal and constraint, if the identified second element is not capable of achieving the at least one goal in accord with the at least one constraint and if the identified second element is capable of achieving the at least one goal in accord with the at least one constraint, receiving no feedback message from the identified second element regarding the at least one goal and at least one constraint, thereby conserving communication bandwidth;

determining an information source able to provide source information that would be useful in achieving the at least one goal;

subscribing to the source information;

receiving the subscribed to source information; and communicating the received source information to the second element, wherein communicating the received source information comprises:

assembling a message including an action type, a command identifier, a publication specification and a publication time; and transmitting the assembled message.

18. A method for communicating between a first element and an identified second element in a distributed system including a plurality of additional elements, the method comprising:

determining, by the first element, contemporaneously with a processing time of a task, at least one goal related to the task to be performed by the identified second element;

determining, by the first element, at least one constraint related to how the at least one goal is to be achieved;

wherein the at least one goal and the at least one constraint are determined by the first element to direct the second element to behave cooperatively with at least one of the plurality of additional elements;

communicating, by the first element, the at least one goal and the at least one constraint to the identified second element; and receiving, at the first element, an error message from the identified second element, in response to the communicated goal and constraint, if the identified second element is not capable of achieving the at least one goal in accord with the at least one constraint and if the identified second element is capable of achieving the at least one goal in accord with the at least one constraint, receiving no feedback message from the identified second element regarding the at least one goal and at least one constraint, thereby conserving communication bandwidth;

determining status information available from the second element that would be useful in monitoring progress of the second element in achieving the at least one goal;

subscribing to the determined status information; and communicating the subscribed to status information to the first element, wherein communicating the status information comprises:

assembling a message including an action type, a command identifier, a publication specification and a publication time; and transmitting the assembled message.

19. A method for communicating between a first element and an identified second element in a distributed system including a plurality of additional elements, the method comprising:

determining, by the first element, contemporaneously with a processing time of a task, at least one goal related to the task to be performed by the identified second element;

determining, by the first element, at least one constraint related to how the at least one goal is to be achieved;

wherein the at least one goal and the at least one constraint are determined by the first element to direct the second element to behave cooperatively with at least one of the plurality of additional elements;

communicating, by the first element, the at least one goal and the at least one constraint to the identified second element; and receiving, at the first element, an error message from the identified second element, in response to the communicated goal and constraint, if the identified second element is not capable of achieving the at least one goal in accord with the at least one constraint and if the identified second element is capable of achieving the at least one goal in accord with the at least one constraint, receiving no feedback message from the identified second element regarding the at least one goal and at least one constraint, thereby conserving communication bandwidth;

evaluating, by the identified second element, the at least one goal and the at least one constraint in light of capabilities of the second element; and communicating an error message, by the identified second element to the first element, if the evaluation indicates that the second element is not capable of achieving the at least one goal in accord with the at least one constraint, wherein evaluating the at least one goal and the at least one constraint in light of capabilities of the second element comprises:

attempting to achieve the at least one goal in accord with the at least one constraint;

monitoring progress of the attempt; and determining that achieving the at least one goal in accord with the at least one constraint is outside the capabilities of the second element, if the monitored progress indicates that the attempt is unsuccessful.

20. A document processing system comprising:

a first xerographic marking engine;

a transport system that is operative to transport media to and/or from the first marking engine, the transport system including a plurality of transport actuators;

at least one actuator controller that is operative to control at least one transport actuator of the plurality of transport actuators to transport print media based on at least one received goal and at least one received constraint; and at least one supervisory controller that is operative to determine, contemporaneously with a transportation of media by the at least one transport actuator, at least one goal and at least one constraint and to communicate the at least one goal and the at least one constraint to the at least one actuator controller;

wherein the at least one goal and the at least one constraint are determined by the at least one supervisory element to direct the at least one actuator controller to behave cooperatively with at least one other actuator controller; and wherein the at least one supervisory controller is operative to receive an error message from the at least one actuator controller, in response to the communicated goal and constraint, if the at least one actuator controller is not capable of achieving the at least one goal in accord with the at least one constraint and if the at least one actuator controller is capable of achieving the at least one goal in accord with the at least one constraint, receiving no feedback message from the at least one actuator controller regarding the at least one goal and at least one constraint, thereby conserving communication bandwidth, wherein communicating the at least one goal and the at least one constraint comprises:

assembling a message including a command type, a command identifier, a command specification and a command time; and transmitting the assembled message from the first element to the second element.

21. The system of claim 20 further comprising:

a plurality of transport sensors, wherein each of the plurality of transport sensors is operative to sense and report one or more aspect of the transportation of the print media as it is transported by the transport system, wherein at least one of the at least one actuator controller and the at least one supervisory controller is operative to select a subset of the plurality of sensors based on the received at least one goal, and to subscribe to information reported by the selected subset of sensors.

22. The system of claim 20 further comprising:

at least a second marking engine, wherein the transport system is further operative to transport media to and/or from the at least a second marking engine; and at least one marking engine controller that is operative to control at least one aspect of processing of at least the second marking engine based on at least one received goal, wherein the at least one supervisory controller is operative to communicate the at least one goal to the at least one marking engine controller.

23. A method that is operative to coordinate activities of a plurality of controllers in a document processing system, the method comprising:

determining, contemporaneously with a processing time of a sheet of print media, a processing path through the document processing system for the sheet of print media, the path including a first module that is tightly coupled to a second module, whereby for at least a portion of a processing performed by the system both the first module and the second module operate on the sheet at the same time;

determining respective first and second controllers associated with the first and second modules;

determining respective cooperative first and second goals and constraints for actions of the first module and the second module;

communicating the respective first cooperative goal and constraint to the first controller; and communicating the respective second cooperative goal and constraint to the second controller; and receiving an error message from the first or second controller, in response to the communicated first or second goal and constraint, if the first or second module is not capable of achieving the respective first or second goal in accord with the respective first or second constraint and if the first or second module is capable of achieving the respective first or second goal in accord with the respective first or second constraint, receiving no feedback message from the first or second controller regarding the respective first or second goal and respective first or second constraint, thereby conserving communication bandwidth, wherein communicating the first cooperative goal and constraint comprises:

assembling a message including a command type, a command identifier, a command specification and a command time; and transmitting the assembled message to the first controller.

24. The method of claim 23 wherein determining cooperative goals and constraints comprises:

determining at least one of compatible speeds of operation and directions to direct the sheet, for the first and second modules, whereby the sheet of print media will not be damaged as the sheet is simultaneously acted upon by the first and second modules.

25. A system comprising:
a first system element;
a second system element; and
a communication link between the first element and the second element, wherein the first system element is operative to determine, contemporaneously with a performance of a task, at least one goal related to the task to be performed by the second element, to determine at least one constraint related to how the at least one goal is to be achieved by the second element and to communicate the at least one goal and the at least one constraint to the second element in a message carried over the communications link, and wherein the second system element is operative to receive the message carried over the communications link, evaluate the at least one goal and the at least one constraint in light of capabilities of the second element and to communicate an error state in a message carried over the communications link to the first element if the evaluation indicates that the second element is not capable of achieving the at least one goal in accord with the at least one constraint and if the second element is capable of achieving the at least one goal in accord with the at least one constraint, communicating no feedback message to the first element regarding the at least one goal and at least one constraint, thereby conserving communication bandwidth, wherein the at least one goal and the at least one constraint are determined by the first element to direct the second element to behave cooperatively with at least one of the plurality of additional elements, wherein the first element is operative to communicate the at least one goal and the at least one constraint by assembling a message including a command type, a command identifier, a command specification and a command time, and communicating the assembled message to the second element.

26. The system of claim 25 further comprising:
a plurality of sensors, wherein each of the plurality of sensors is operative to sense and report one or more aspects of the task performed by the second element, wherein the second element is operative to select a subset of the plurality of sensors based on the received at least one goal and to subscribe to information reported by the selected subset of sensors.

27. The system of claim 25 further comprising:
a plurality of sensors, wherein each of the plurality of sensors is operative to sense and report one or more aspects of the task as the task is performed by the system, and wherein the first element is operative to select a subset of the plurality of sensors based on the at least one communicated goal and to subscribe to information reported by the selected subset of sensors.

28. The system of claim 27 wherein the first element is further operative to communicate to the second element, aspects of task information received, directly or indirectly, from the subset of sensors, based on the subscription.

29. The system of claim 28 wherein the second element is further operative to receive the aspects of task information from the first element and evaluate at least one aspect of performance based on the received aspects of task information.

30. The system of claim 25 wherein the second element is further operative to evaluate the at least one goal and the at least one constraint in light of capabilities of the second element and to communicate an error message to the first element if the evaluation indicates that the second element is not capable of achieving the at least one goal in accord with the at least one constraint.

31. The system of claim 25 comprising:
a first xerographic marking engine;
a transport system that is operative to transport media to and/or from the first marking engine, the transport system including a plurality of transport actuators;
wherein the second system element comprises at least one actuator controller that is operative to control at least one transport actuator of the plurality of transport actuators to transport print media based on at least one received goal and at least one received constraint; and
wherein the first system element comprises at least one supervisory controller that is operative to communicate at least one goal and at least one constraint to the at least one actuator controller.

32. A system comprising:
a first system element;
a second system element;
a communication link between the first element and the second element, wherein the first system element is operative to determine, contemporaneously with a performance of a task, at least one goal related to the task to be performed by the second element, to determine at least one constraint related to how the at least one goal is to be achieved by the second element and to communicate the at least one goal and the at least one constraint to the second element in a message carried over the communications link, and wherein the second system element is operative to receive the message carried over the communications link, evaluate the at least one goal and the at least one constraint in light of capabilities of the second element and to communicate an error state in a message carried over the communications link to the first element if the evaluation indicates that the second element is not capable of achieving the at least one goal in accord with the at least one constraint and if the second element is capable of achieving the at least one goal in accord with the at least one constraint, communicating no feedback message to the first element regarding the at least one goal and at least one constraint, thereby conserving communication bandwidth, wherein the at least one goal and the at least one constraint are determined by the first element to direct the second element to behave cooperatively with at least one of the plurality of additional elements; and
a plurality of sensors, wherein each of the plurality of sensors is operative to sense and report one or more aspects of the task performed by the second element, wherein the second element is operative to select a subset of the plurality of sensors based on the received at least one goal and to subscribe to information reported by the selected subset of sensors, wherein the second element is operative to subscribe to the information reported by the selected subset of sensors by assembling a message including an action type, a command identifier, a subscription specification and a subscription time and transmitting the assembled message.

33. A system comprising:
a first system element;
a second system element;
a communication link between the first element and the second element, wherein the first system element is operative to determine, contemporaneously with a performance of a task, at least one goal related to the task to be performed by the second element, to determine at least one constraint related to how the at least one goal is to be achieved by the second element and to communicate the at least one goal and the at least one constraint to the second element in a message carried over the communications link, and wherein the second system element is operative to receive the message carried over the communications link, evaluate the at least one goal and the at least one constraint in light of capabilities of the second element and to communicate an error state in a message carried over the communications link to the first element if the evaluation indicates that the second element is not capable of achieving the at least one goal in accord with the at least one constraint and if the second element is capable of achieving the at least one goal in accord with the at least one constraint, communicating no feedback message to the first element regarding the at least one goal and at least one constraint, thereby conserving communication bandwidth, wherein the at least one goal and the at least one constraint are determined by the first element to direct the second element to behave cooperatively with at least one of the plurality of additional elements; and a plurality of sensors, wherein each of the plurality of sensors is operative to sense and report one or more aspects of the task as the task is performed by the system, and wherein the first element is operative to select a subset of the plurality of sensors based on the at least one communicated goal and to subscribe to information reported by the selected subset of sensors, wherein the first element is operative to subscribe to the information reported by the selected subset of sensors by assembling a message including an action type, a command identifier, a subscription specification and a subscription time and transmitting the assembled message.

34. A system comprising:
a first system element;
a second system element; and
a communication link between the first element and the second element, wherein the first system element is operative to determine, contemporaneously with a performance of a task, at least one goal related to the task to be performed by the second element, to determine at least one constraint related to how the at least one goal is to be achieved by the second element and to communicate the at least one goal and the at least one constraint to the second element in a message carried over the communications link, and wherein the second system element is operative to receive the message carried over the communications link, evaluate the at least one goal and the at least one constraint in light of capabilities of the second element and to communicate an error state in a message carried over the communications link to the first element if the evaluation indicates that the second element is not capable of achieving the at least one goal in accord with the at least one constraint and if the second element is capable of achieving the at least one goal in accord with the at least one constraint, communicating no feedback message to the first element regarding the at least one goal and at least one constraint, thereby conserving communication bandwidth, wherein the at least one goal and the at least one constraint are determined by the first element to direct the second element to behave cooperatively with at least one of the plurality of additional elements, wherein the first element is further operative to subscribe to the status information of the second element by assembling a message including an action type, a command identifier, a subscription specification and a subscription time and transmitting the assembled message.

35. The system of claim 34 wherein the first element is operative to assemble the message by including an action type of -subscribe-; and including a list of one or more variables to which the first element is subscribing and wherein the second element is operative to communicate the subscribed to status information to the first element by assembling a message including an action type, a command identifier, a publication specification and a publication time, and transmitting the assembled message.

36. The system of claim 35 wherein the second element is operative to assemble the message by including an action type of -update- and including a publication specification specifying at least one variable value of at least one variable to which the first element subscribed.

* * * * *